US010459599B2

(12) United States Patent
Sawaki

(10) Patent No.: US 10,459,599 B2
(45) Date of Patent: Oct. 29, 2019

(54) METHOD FOR MOVING IN VIRTUAL SPACE AND INFORMATION PROCESSING APPARATUS FOR EXECUTING THE METHOD

(71) Applicant: COLOPL, Inc., Tokyo (JP)

(72) Inventor: Kazuaki Sawaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/905,731

(22) Filed: Feb. 26, 2018

(65) Prior Publication Data
US 2018/0329603 A1    Nov. 15, 2018

(30) Foreign Application Priority Data

Feb. 27, 2017   (JP) .................................. 2017-035154

(51) Int. Cl.
*G06F 3/00* (2006.01)
*G06F 3/0481* (2013.01)
(Continued)

(52) U.S. Cl.
CPC ...... *G06F 3/04815* (2013.01); *A63F 13/5252* (2014.09); *A63F 13/5378* (2014.09);
(Continued)

(58) Field of Classification Search
CPC .......... G02B 27/017; G02B 2027/0187; G02B 27/0179; G02B 27/0093; G02B 27/0172;
(Continued)

(56) References Cited

U.S. PATENT DOCUMENTS 6,346,938 B1 *  2/2002  Chan ................... G06F 3/04815
                                                                345/419
2003/0005439 A1 *  1/2003  Rovira ................... H04N 7/163
                                                                725/37

(Continued)

FOREIGN PATENT DOCUMENTS

JP        7-64709 A      3/1995
JP     2000-244886 A     9/2000
(Continued)

OTHER PUBLICATIONS

Koji Yumoto et al., "A Visualization Technique for Supporting Joint Attention in a Collaborative Virtual Environment", IEICE Technical Report, vol. 108 No. 226, The Institute of Electronics, Information and Communication Engineers, Sep. 25, 2008, pp. 79-84, Japan, 6pp.

(Continued)

*Primary Examiner* — Justin L Myhr
(74) *Attorney, Agent, or Firm* — Hauptman Ham, LLP

(57) ABSTRACT

A method includes defining a virtual space. The virtual space includes a viewpoint associated with a first user, a first object, and a map object. At least one location option is associated with the map object. The method further includes defining a visual field based on a position of the viewpoint in the virtual space. The method further includes generating a visual-field image based on the visual field. The method further includes receiving a selection of any location option of the at least one location option by the first user. The method further includes moving the viewpoint to the selected location option. The method further includes updating the visual field based on a position of the selected viewpoint in the virtual space.

20 Claims, 24 Drawing Sheets

(51) Int. Cl.

| | | |
|---|---|---|
| *G06F 3/01* | (2006.01) | |
| *G02B 27/01* | (2006.01) | |
| *G06T 13/40* | (2011.01) | |
| *A63F 13/5252* | (2014.01) | |
| *A63F 13/5378* | (2014.01) | |
| *G06F 1/16* | (2006.01) | |
| *A63F 13/428* | (2014.01) | |
| *G02B 27/22* | (2018.01) | |
| *G02B 27/00* | (2006.01) | |

(52) U.S. Cl.
CPC ........... *G02B 27/017* (2013.01); *G06F 1/163* (2013.01); *G06F 3/011* (2013.01); *G06F 3/012* (2013.01); *G06F 3/013* (2013.01); *G06F 3/014* (2013.01); *G06T 13/40* (2013.01); *A63F 13/428* (2014.09); *G02B 27/0093* (2013.01); *G02B 27/0179* (2013.01); *G02B 27/2264* (2013.01); *G02B 2027/014* (2013.01); *G02B 2027/0138* (2013.01); *G02B 2027/0141* (2013.01); *G02B 2027/0187* (2013.01)

(58) Field of Classification Search
CPC .......... G06F 1/163; G06F 3/011; G06F 3/012; G06F 3/013; G06F 3/014; G06F 3/04815; G06F 3/14; G06F 3/1431; G06T 13/40; G09G 2354/00
See application file for complete search history.

(56) References Cited

U.S. PATENT DOCUMENTS

| | | | | |
|---|---|---|---|---|
| 2003/0190951 | A1* | 10/2003 | Matsumoto | A63F 13/10 |
| | | | | 463/30 |
| 2006/0206560 | A1* | 9/2006 | Kanada | H04L 29/06027 |
| | | | | 709/201 |
| 2008/0070682 | A1* | 3/2008 | Woody | A63F 13/06 |
| | | | | 463/30 |
| 2008/0300053 | A1* | 12/2008 | Muller | G06F 17/24 |
| | | | | 463/31 |
| 2012/0032877 | A1* | 2/2012 | Watkins, Jr. | G06F 1/1624 |
| | | | | 345/156 |
| 2012/0295708 | A1* | 11/2012 | Hernandez-Abrego | |
| | | | | G10L 15/26 |
| | | | | 463/36 |
| 2014/0106710 | A1* | 4/2014 | Rodriguez | H04M 1/7253 |
| | | | | 455/411 |
| 2016/0364088 | A1* | 12/2016 | Bejot | G06F 3/0482 |
| 2017/0076503 | A1* | 3/2017 | Tamaoki | G06T 19/006 |
| 2017/0285737 | A1* | 10/2017 | Khalid | G06F 3/013 |

FOREIGN PATENT DOCUMENTS

| | | |
|---|---|---|
| JP | 2001-338311 A | 12/2001 |
| JP | 2012-63253 A | 3/2012 |
| JP | 5838278 B1 | 1/2016 |
| JP | 5914739 B1 | 5/2016 |

OTHER PUBLICATIONS

Yasuhito Noguchi et al., "Study on Placement and Presentation of Multiple Avatars in MR-based Distributed Meeting", Transactions of Information Processing Society of Japan, vol. 48 No. 1, Information Processing Society of Japan, Jan. 15, 2007, pp. 54-62, Japan, 10pp.

Office Action in JP Application No. 2017-035154, dated Oct. 10, 2017, 10pp.

Notice of Allowance in JP Application No. 2017-035154, dated Feb. 14, 2018, 5pp.

* cited by examiner

FIG. 15

Table 1510:

| USER ID 1511 | NAME 1512 | LOGIN STATUS 1513 | SEATING STATUS 1514 | SEATING LOCATION 1515 | POSITION INFORMATION (x, y, z) 1516 |
|---|---|---|---|---|---|
| 001 | A | LOGGED IN | SEATED | SEAT 1 IN ROW A | ... |
| 002 | B | LOGGED IN | SEATED | SEAT 2 IN ROW A | ... |
| 003 | C | LOGGED IN | SEATED | SEAT 4 IN ROW A | ... |
| 004 | D | LOGGED OUT | ABSENT | NULL | NULL |
| ... | ... | ... | ... | ... | ... |

Table 1520:

| LOCATION OPTION 1521 | STATUS 1522 |
|---|---|
| SEAT 1 IN ROW A | OCCUPIED |
| SEAT 2 IN ROW A | OCCUPIED |
| SEAT 3 IN ROW A | VACANT |
| SEAT 4 IN ROW A | OCCUPIED |
| SEAT 5 IN ROW A | VACANT |

Table 1530:

| No. 1531 | USER ID 1532 | POSITION INFORMATION 1533 | TIME STAMP 1534 |
|---|---|---|---|
| 01 | 001 | $(X_{11}, Y_{11}, Z_{11})$ | YYYYMMDDhhmmss |
| 02 | 002 | $(X_{21}, Y_{21}, Z_{21})$ | ... |
| 03 | 001 | $(X_{12}, Y_{12}, Z_{12})$ | ... |
| 04 | ... | ... | ... |

METHOD FOR MOVING IN VIRTUAL SPACE AND INFORMATION PROCESSING APPARATUS FOR EXECUTING THE METHOD

RELATED APPLICATIONS

The present application claims priority to Japanese application No. 2017-035154, filed Feb. 27, 2017, the disclosure of which is hereby incorporated by reference herein in its entirety.

TECHNICAL FIELD

This disclosure relates to a technology of providing a virtual space, and more particularly, to a technology of implementing movement in a virtual space.

BACKGROUND

There is known a technology of enabling movement in a virtual reality space (hereinafter also simply referred to as "virtual space"). For example, in Japanese Patent No. 5838278 (Patent Document 1), there is disclosed a technology for "providing a simulation game with a higher game quality". In Japanese Patent Application Laid-open No. 2001-338311 (Patent Document 2), there is disclosed a "virtual reality space movement control device configured to enable a user to easily grasp where the user is located in a virtual space and easily move to a location or scene of interest for the user without an unnecessary and complicated space movement operation". This virtual reality space movement control device is used to "move freely in the virtual space to view the virtual space by operating an input device, for example, a mouse". Further, the virtual reality space movement control device "includes a sub-screen for assisting in movement in a virtual world independently of a main screen for displaying the virtual world, displays a plan view of the entire virtual space being explored by the user on a sub-screen frame, displays a camera mark indicating a current camera position and an eye-gaze direction on the plan view, and includes virtual space exploration guidance means for receiving an instruction to move in the virtual space to assist the user in exploring the space, to thereby solve the above-mentioned problem" (refer to "Abstract").

PATENT DOCUMENTS

[Patent Document 1] JP 5838278 B2
[Patent Document 2] JP 2001-338311 A

SUMMARY

According to at least one embodiment of this disclosure, there is provided a method including defining a virtual space, wherein the virtual space includes a viewpoint associated with a first user, a first object, and a map object, and wherein at least one location option is associated with the map object. The method further includes defining a visual field that depends on a position of the viewpoint in the virtual space. The method further includes generating a visual-field image that depends on the visual field. The method further includes receiving selection of any one of the at least one location option by the first user. The method further includes moving the viewpoint to the selected one of the at least one location option. The method further includes updating the visual field based on a position of the selected viewpoint in the virtual space.

The above-mentioned and other objects, features, aspects, and advantages of at least one embodiment of the disclosure are made clear from the following detailed description of this disclosure, which is to be understood in association with the attached drawings.

BRIEF DESCRIPTION OF THE DRAWINGS

FIG. 15 A diagram of a mode of storage of data in a memory according to at least one embodiment of this disclosure.

DETAILED DESCRIPTION

Now, with reference to the drawings, at least one embodiment of this disclosure is described. In the following description, like components are denoted by like reference symbols. The same applies to the names and functions of those components. Therefore, detailed description of those components is not repeated.

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
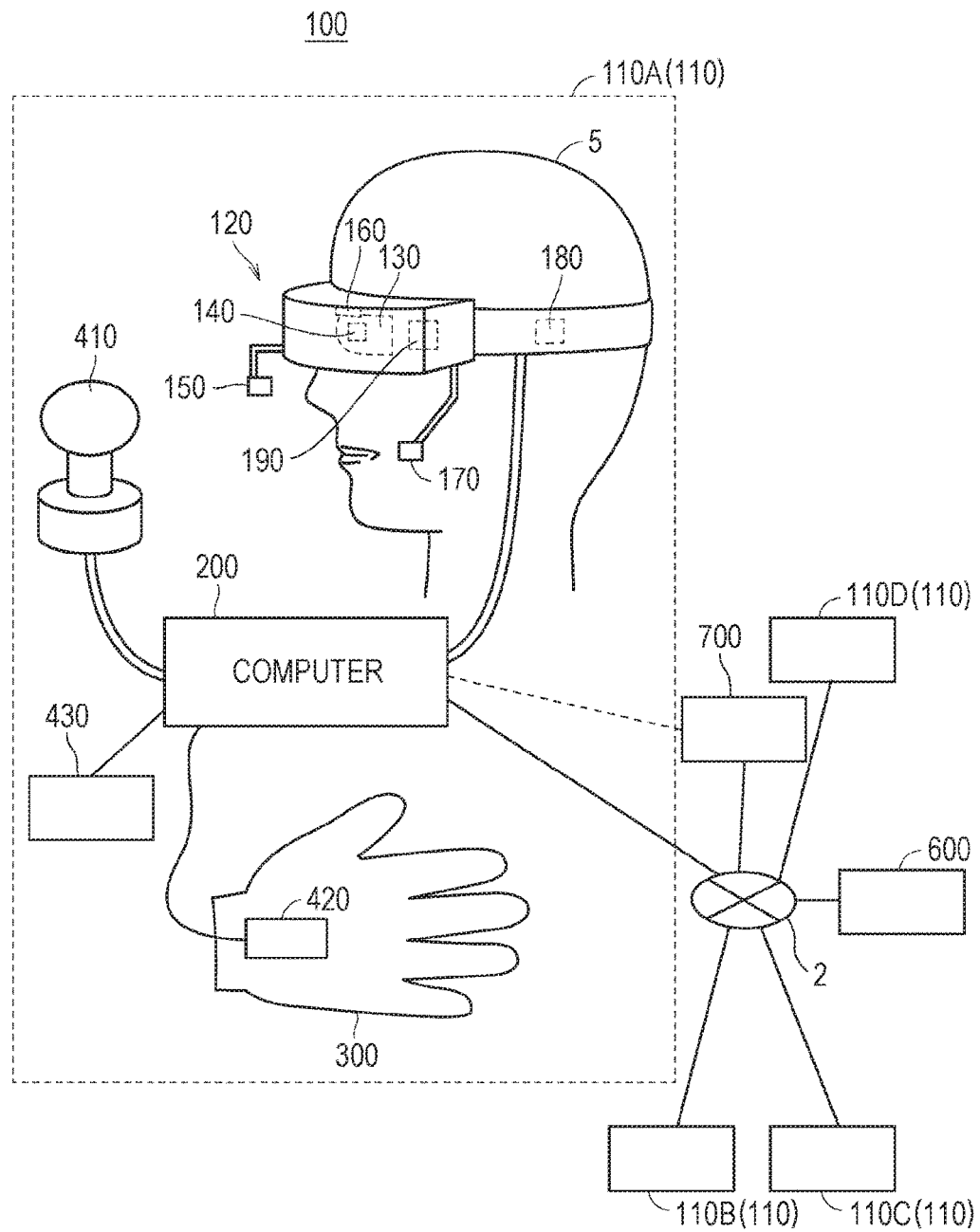
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
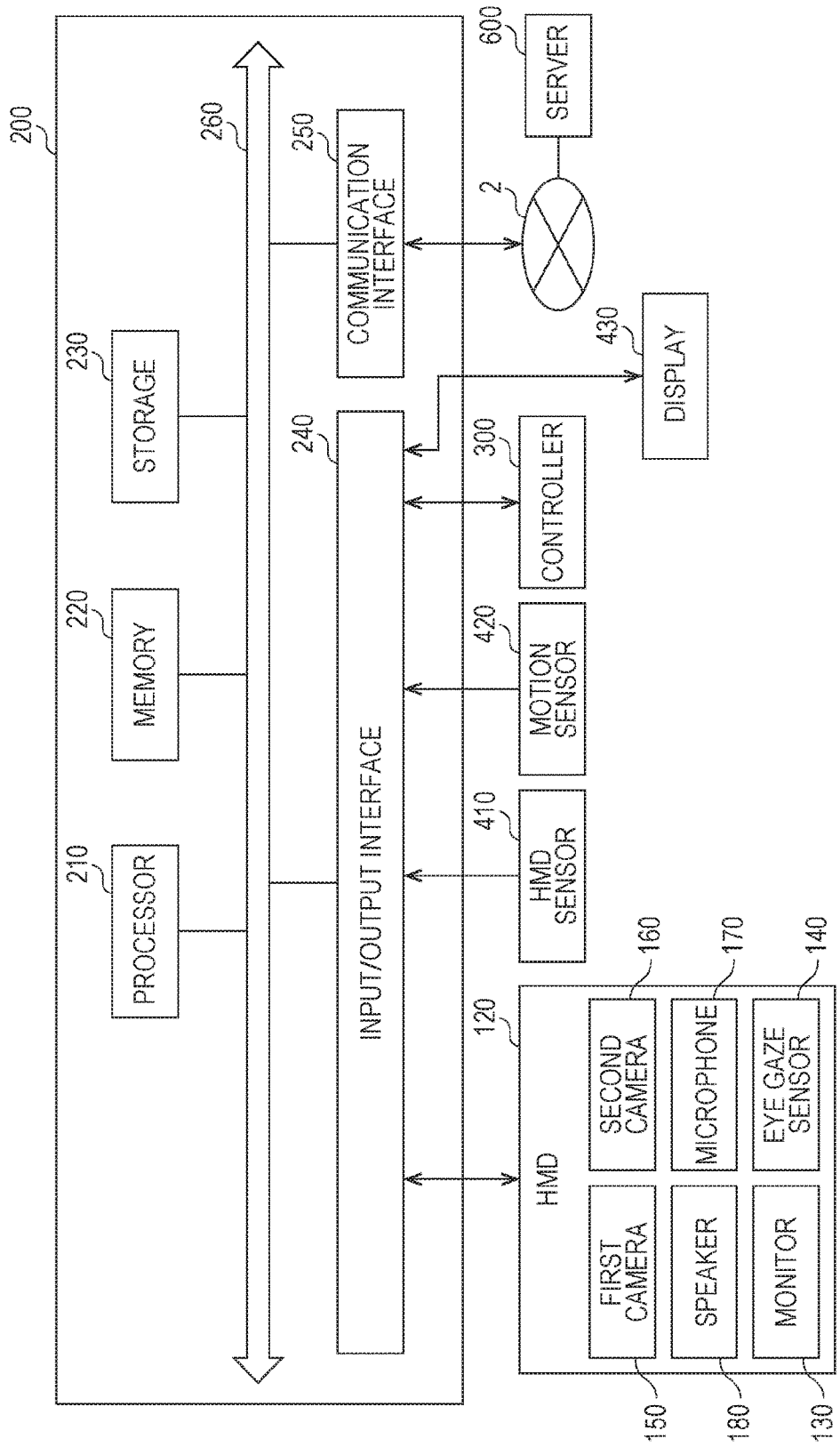
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
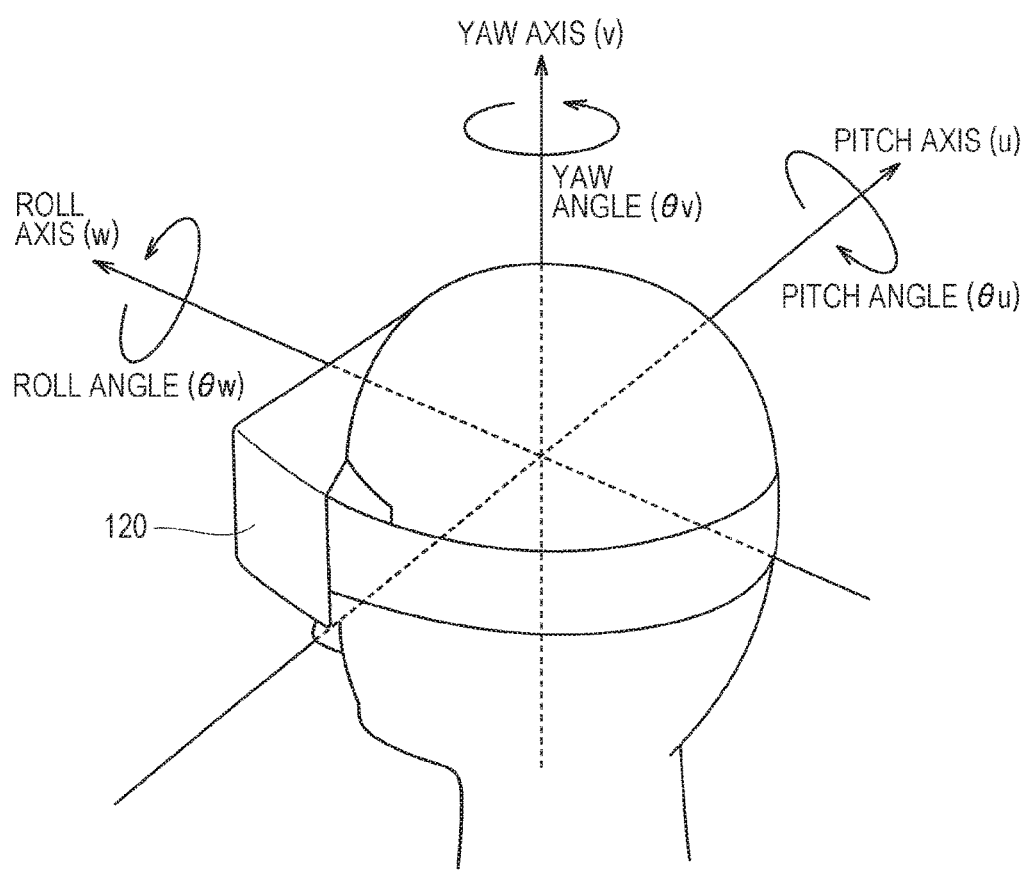
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle (ev), and a roll angle (ew) of the HMD 120 in the uvw visual-field coordinate system. The pitch angle (eu) represents an inclination angle of the HMD 120 about the pitch axis in the uvw visual-field coordinate system. The yaw angle (ev) represents an inclination angle of the HMD 120 about the yaw axis in the uvw visual-field coordinate system. The roll angle (ew) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
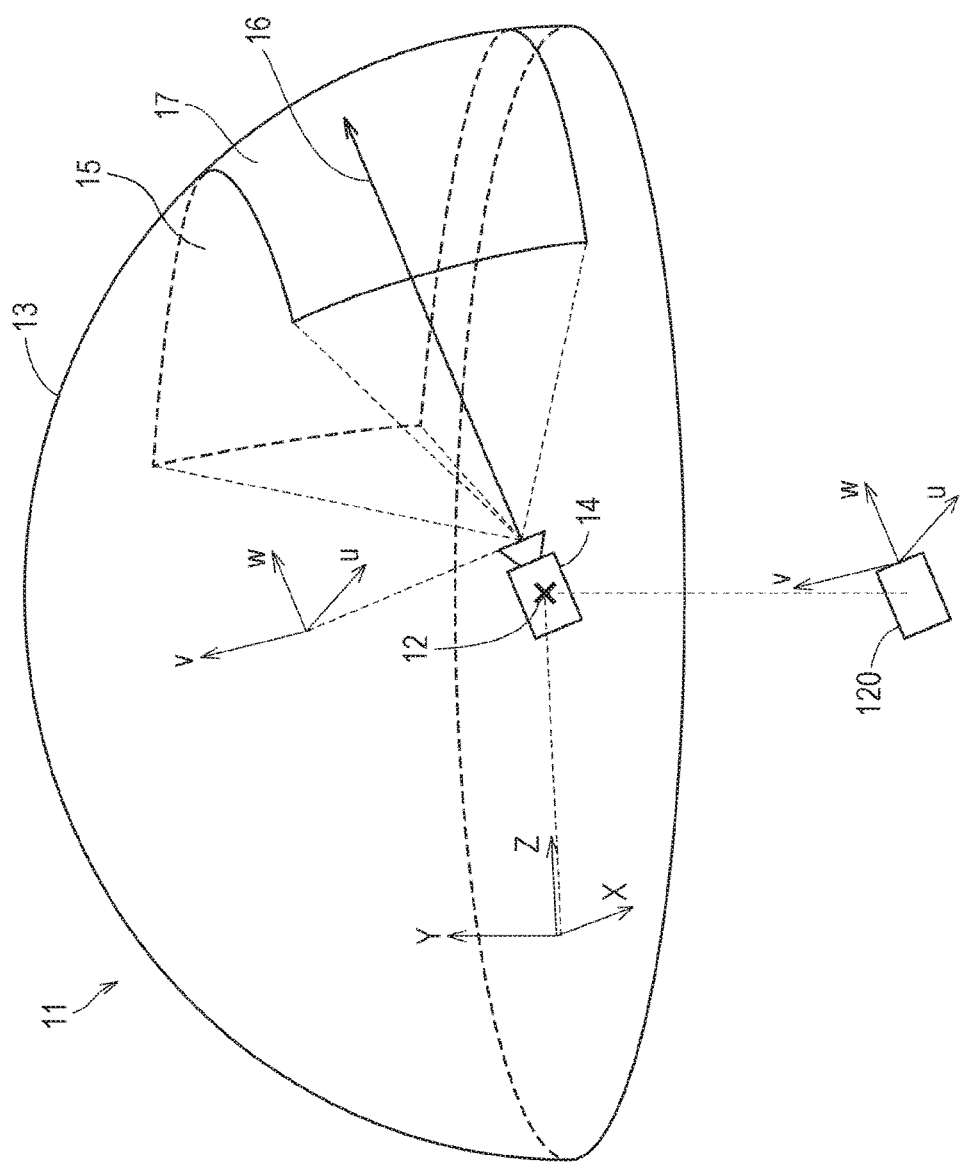
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
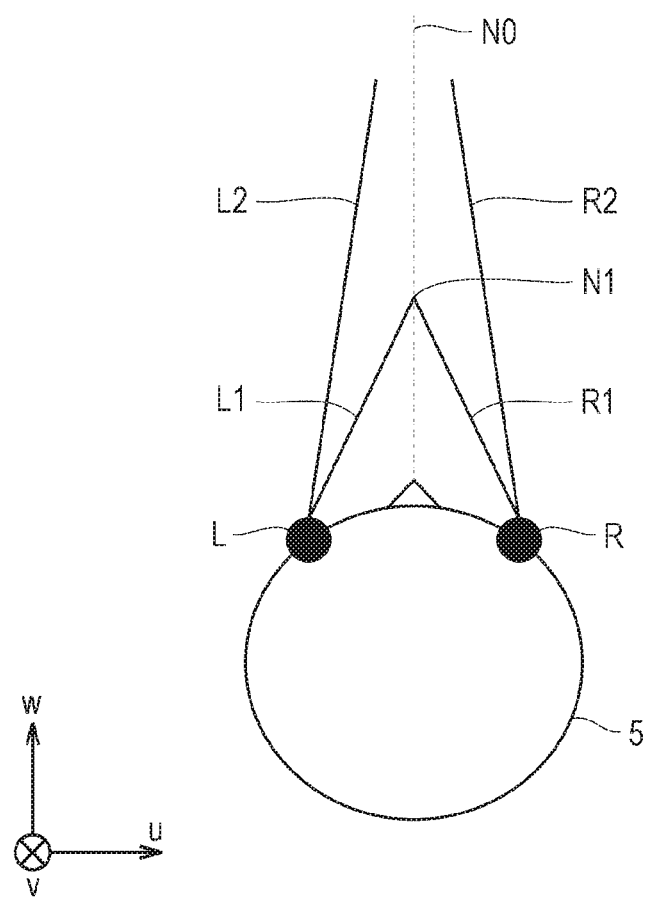
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
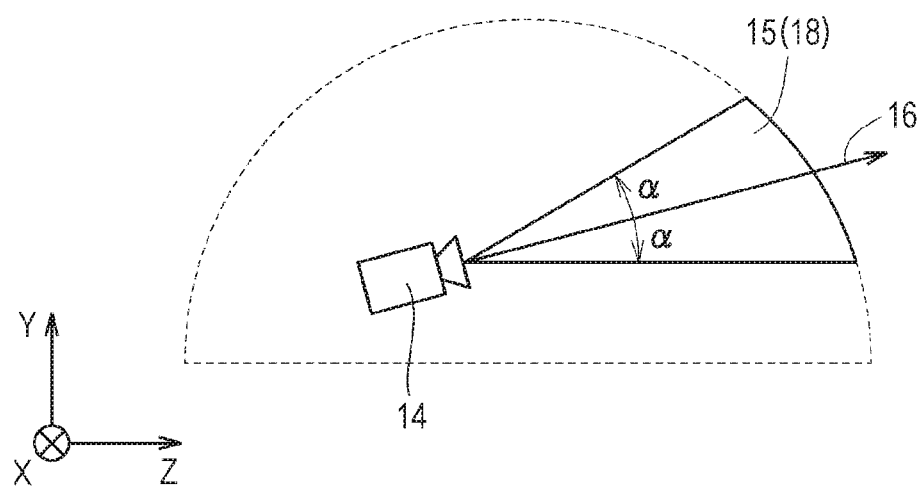
FIG. 6 A diagram of a YZ cross section obtained by viewing a field-of-view region from an X direction in the virtual space according to at least one embodiment of this disclosure.
Figure 7:
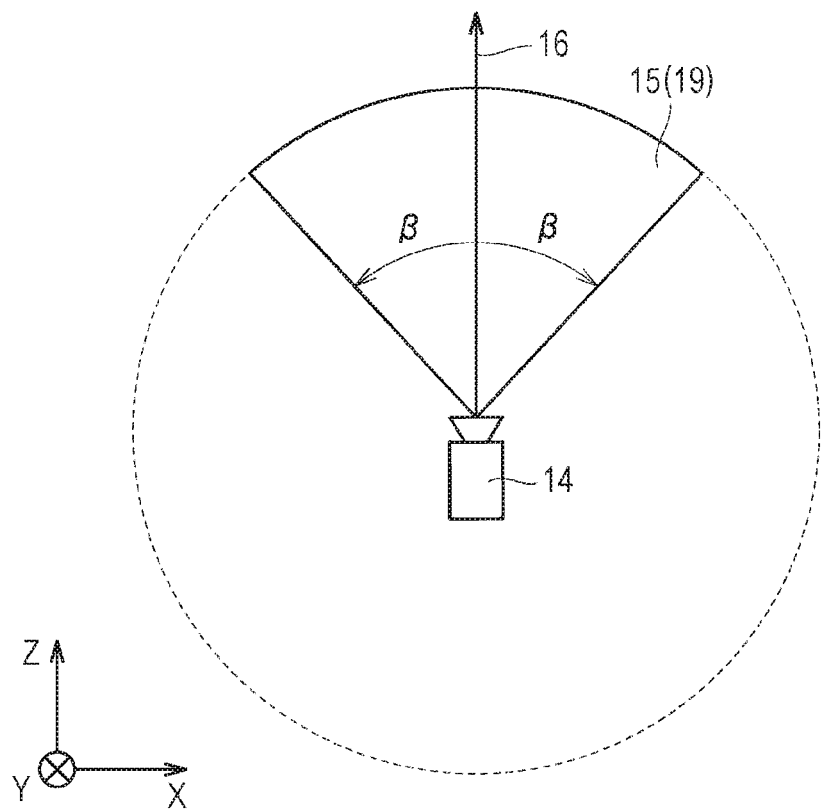
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle $\alpha$ from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth R from the reference line of sight 16 serving as the center in the virtual space 11 as the region 19. The polar angle $\alpha$ and $\beta$ are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to apart of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
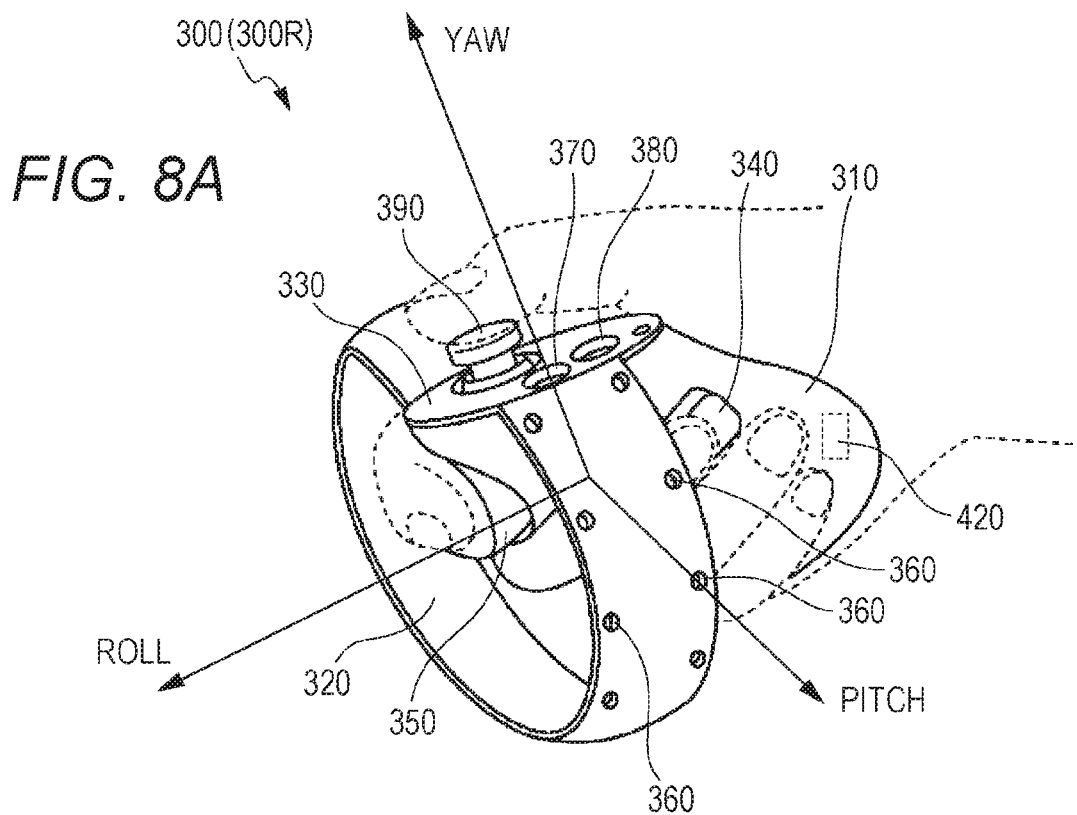
FIG. 8A A diagram of a schematic configuration of a controller according to at least one embodiment of this disclosure.
Figure 8B:
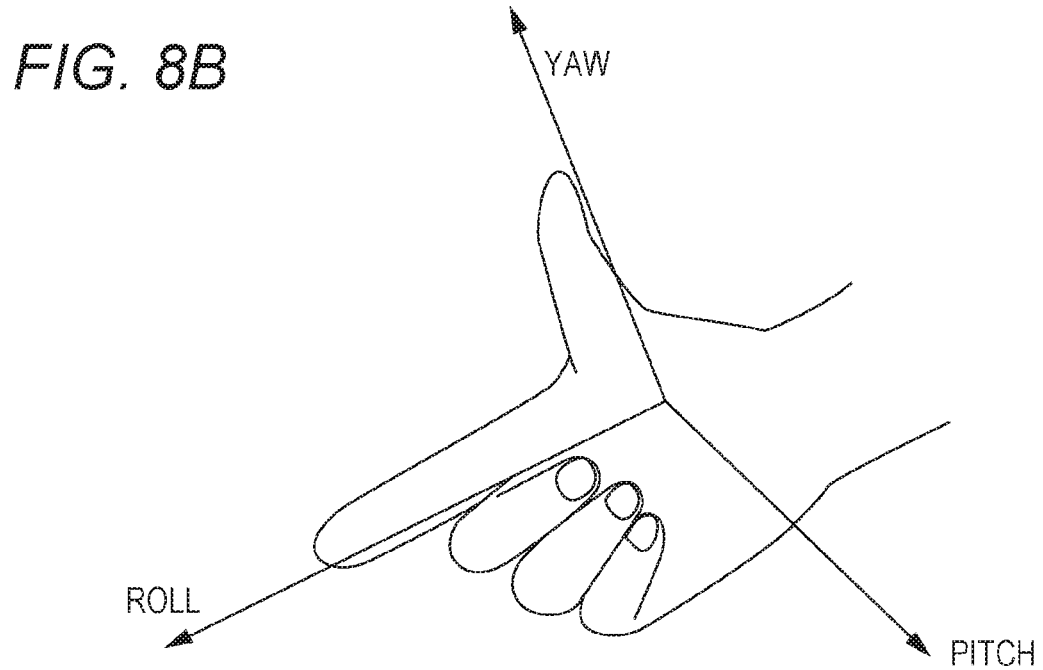
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
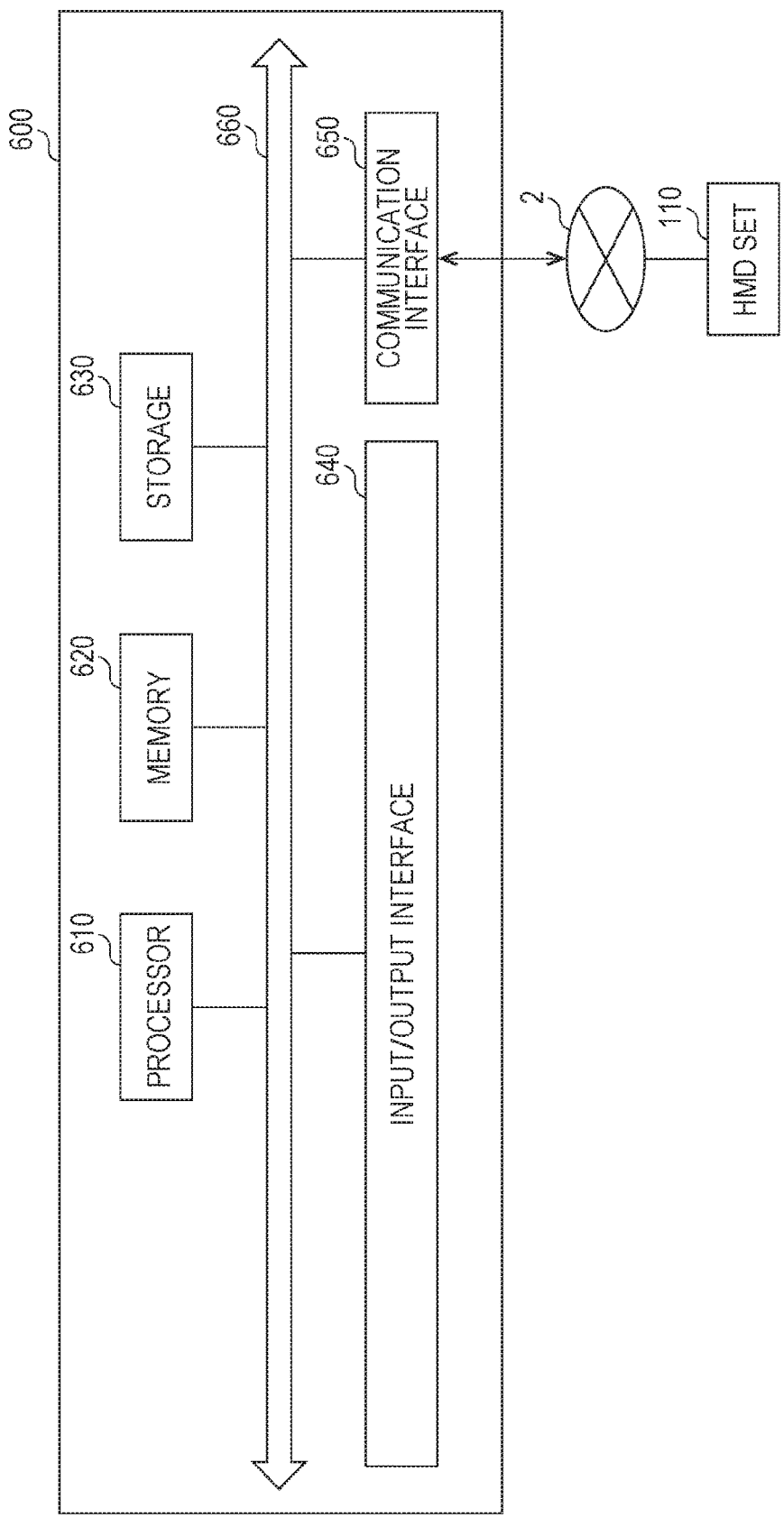
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
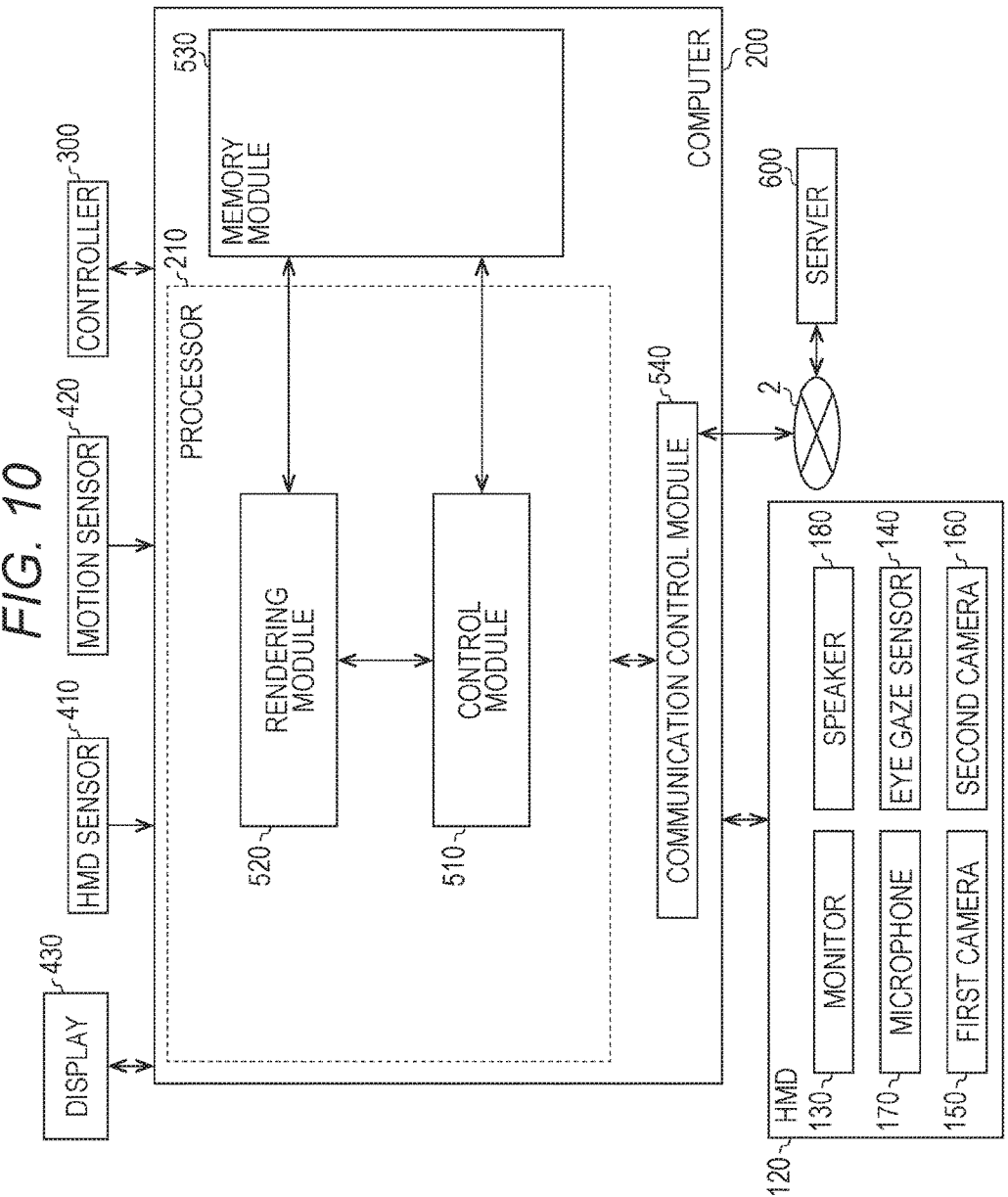
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
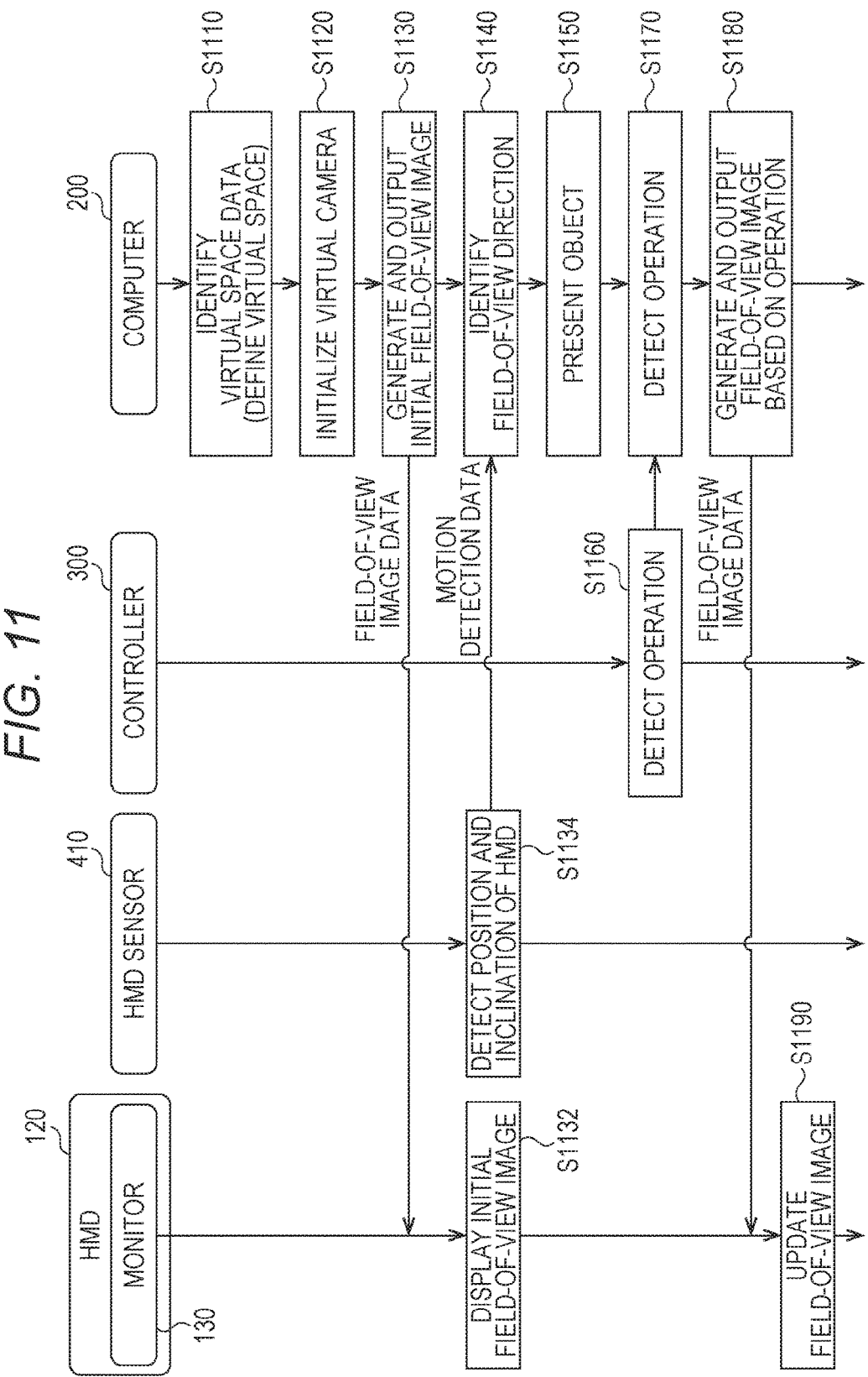
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
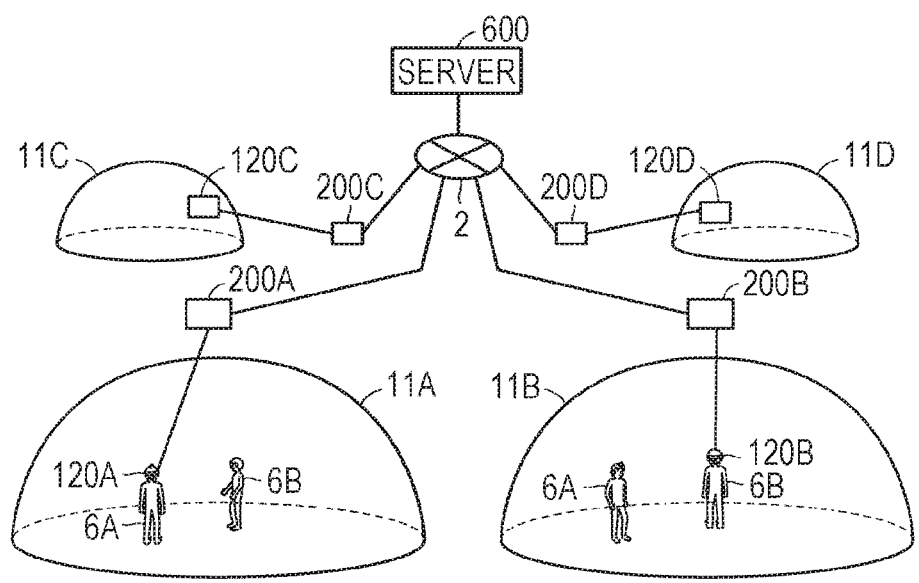
FIG. 12A A schematic diagram of HMD systems of several users sharing the virtual space interact using a network according to at least one embodiment of this disclosure.
Figure 12B:
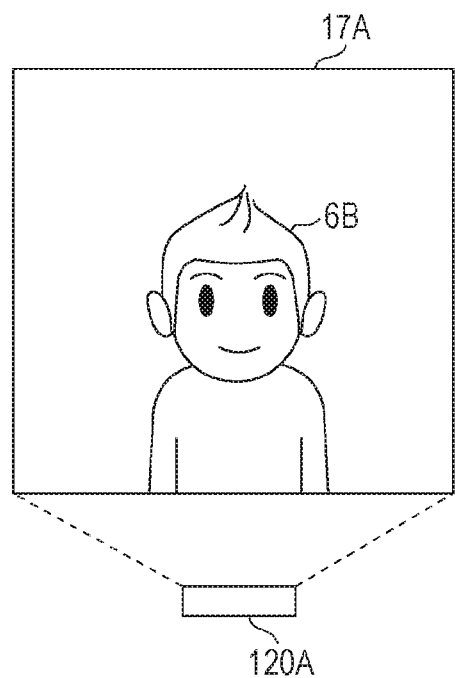
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
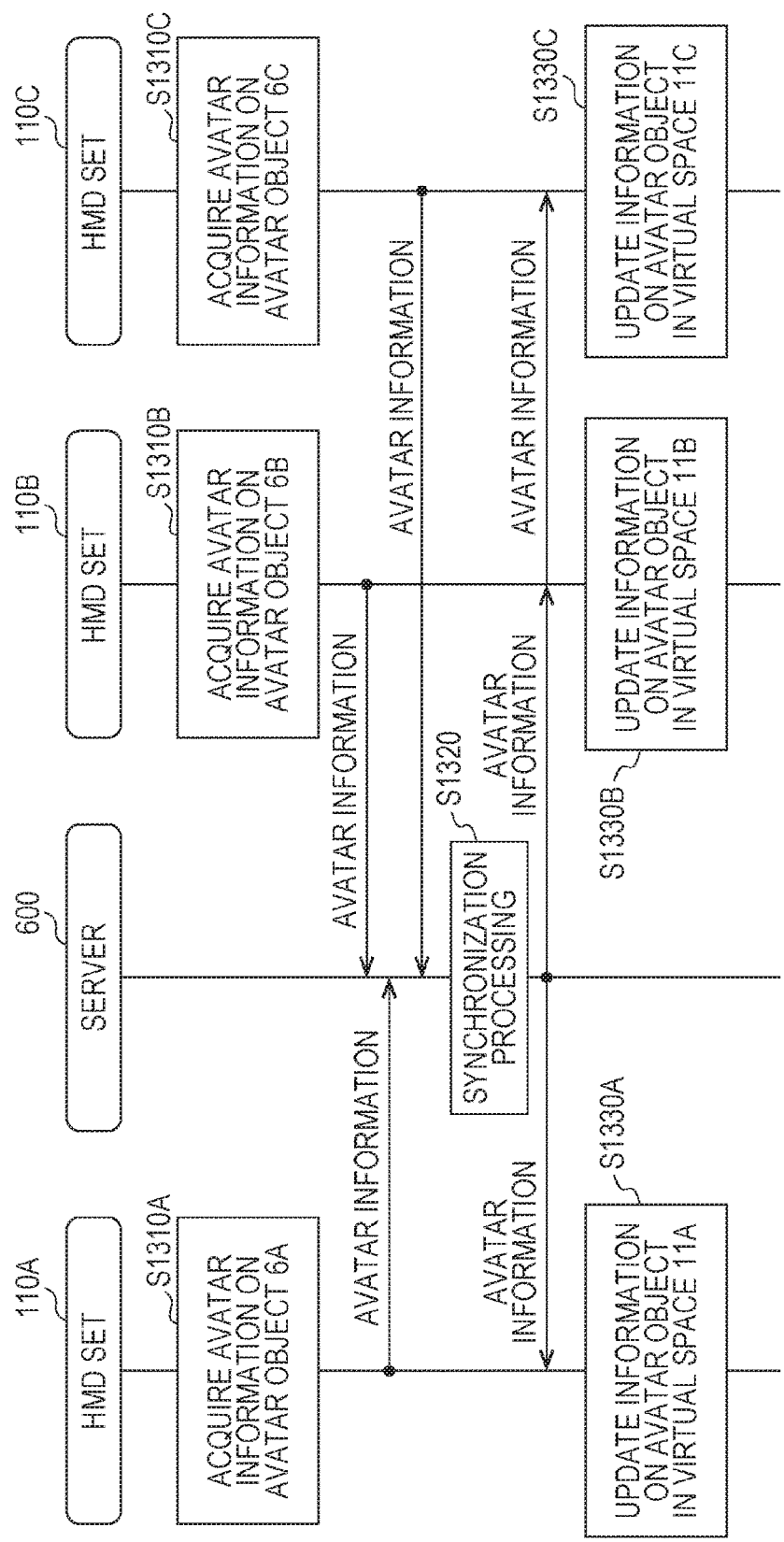
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 10C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
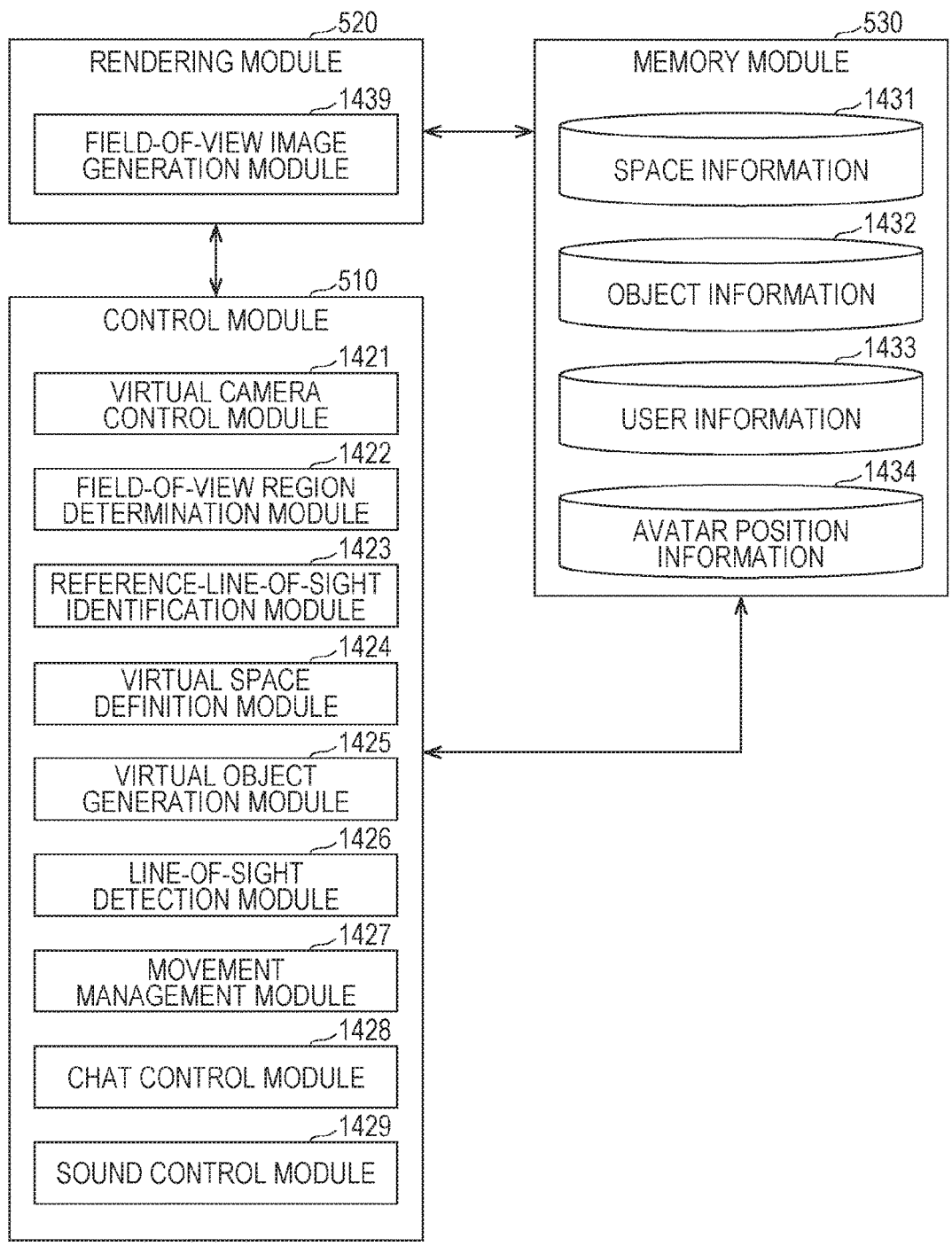
FIG. 14 A block diagram of a configuration of modules of the computer according to at least one embodiment of this disclosure.

With reference to FIG. 14, a module configuration of the computer 200 is described. FIG. 14 is a block diagram of a configuration of modules of the computer according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, a line-of-sight detection module 1426, a movement management module 1427, a chat control module 1428, and a sound control module 1429. The rendering module 520 includes a field-of-view image generation module 1439. The memory module 530 stores space information 1431, object information 1432, user information 1433, and avatar position information 1434.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15 in accordance with the direction of the head of the user 5 wearing the HMD 120. The field-of-view image generation module 1439 generates a field-of-view image to be displayed on the monitor 130 based on the determined field-of-view region 15. Further, the field-of-view image generation module 1439 generates a field-of-view image based on data received from the control module 510. Data on the field-of-view image generated by the field-of-view image generation module 1439 is output to the HMD 120 by the communication control module 240. The reference-line-of-sight identification module 1423 identifies the line of sight of the user 5 based on the signal from the eye gaze sensor 140.

The sound control module 1429 detects, from the HMD 120, input of a sound signal that is based on utterance of the user 5 into the computer 200. The sound control module 1429 assigns the sound signal corresponding to the utterance with an input time of the utterance to generate sound data. The sound control module 1429 transmits the sound data to a computer used by a user who is selected by the user 5 among the other computers 200B to 200D in the state of being capable of communicating to/from the computer 200 as chat partners of the user 5.

The control module 510 controls the virtual space 11 to be provided to the user 5. First, the virtual space definition module 1424 generates virtual space data representing the virtual space 11, to thereby define the virtual space 11 in the HMD set 110.

The virtual object generation module 1425 generates data on objects to be arranged in the virtual space 11. For example, the virtual object generation module 1425 generates data on avatar objects representing the respective other users 5B to 5D, who are to chat with the user 5 via the virtual space 11. Further, the virtual object generation module 1425 may change the line of sight of the avatar object of the user based on the lines of sights detected in response to utterance of the other users 5B to 5D.

The line-of-sight detection module 1426 detects the line of sight of the user 5 based on output from the eye gaze sensor 140. In at least one aspect, the line-of-sight detection module 1426 detects the line of sight of the user 5 at the time of utterance of the user 5 when such utterance is detected. Detection of the line of sight is implemented by a technology, for example, non-contact eye tracking. As an example, as in the case of the limbus tracking method, the eye gaze sensor 140 may detect a motion of the line of sight of the user 5 based on data obtained by radiating an infrared ray to eyes of the user 5 and photographing the reflected light with a camera (now shown). In at least one aspect, the line-of-sight detection module 1426 identifies each position that depends on a motion of the line of sight of the user 5 as coordinate values (x, y) with a certain position on a display region of the monitor 130 serving as a reference point.

The movement management module 1427 manages movement of an avatar object corresponding to the user 5 of the computer 200 in the virtual space 11. In at least one aspect, the movement management module 1427 determines whether or not the avatar object can move to a location specified by the user 5 in the virtual space 11. This determination is performed based on, for example, a usage situation of the location. Data representing the usage situation is stored by the server 600. In at least one aspect, the movement management module 1427 acquires a movement history of the user 5, stores the history into the computer 200, and transmits the history to the server 600. The movement history contains, for example, a user ID, coordinate values in the virtual space 11, and time data.

In at least one aspect, the virtual object generation module 1425 generates data for presenting a map object containing one or more location options selectable by the user 5 in the virtual space 11. The field-of-image generation module 1439 generates data for presenting a field of view containing the map object based on the data for output to the monitor 130. The map object is presented, for example, at an upper position in the virtual space 11. The map object is not necessarily presented at an upper position in the virtual space 11, and may be presented at any position as long as the map object does not impair the visibility of other existing objects (e.g., avatar objects of other users, chairs, and tables). When the monitor 130 displays the field of view based on the data, the user 5 recognizes the map object in the virtual space 11. The map object is constructed so as to represent locations selectable by one or more users sharing the virtual space 11 in bird's eye view, for example. The map object contains one or more selectable sub-items. In at least one embodiment, the sub-items correspond to seats. Seats not used by the other users may be location options that can be selected by the user 5 for movement.

The user 5 can operate the controller 300 to select any one of seats in the map object. When the user 5 selects a seat, the movement management module 1427 determines that a location option corresponding to the seat is selected. In at least one aspect, when the user 5 directs his or her line of sight toward the map object, the line-of-sight detection module 1426 detects the line of sight of the user 5 that is directed toward the map object based on a signal output by the eye gaze sensor 140. When the user 5 continues to look at any one of location options in the map object for a predetermined period of time, the movement management module 1427 determines the location option as a movement destination of the avatar object corresponding to the user 5. The field-of-image generation module 1439 generates a field-of-view image for moving the point of view of the user 5 in the virtual space 11 to the location option based on the determination for output to the monitor 130. When the user 5 wearing the HMD 120 visually recognizes an image displayed on the monitor 130, the user 5 can recognize the fact that the user 5 has moved to the selected location option.

For example, in a case where the virtual space 11 is a conference room, when the user 5 at the entrance of the conference room looks at the ceiling of the conference room, a map object is presented. The map object corresponds to seats provided around a table in the conference room. Seats already occupied by avatar objects corresponding to the other users and vacant seats are presented in a distinguishable manner in the map object. The vacant seats are selectable by the user 5 as location options. The user 5 can operate the controller 300 to select a vacant seat as a movement destination location. In at least one aspect, when the user 5 continues to look at any one of the vacant seats, the vacant seat may be determined as the movement destination location. After that, when the user 5 performs a predetermined motion as a motion for establishing the selection, the user 5 moves to the location. For example, when the user 5 presses an OK button of the controller 300, the vacant seat is established as the movement destination location. As a result, the point of view (namely, virtual camera 14) of the user 5 moves to that location.

In at least one aspect, the virtual object generation module 1425 detects a motion of the user 5 based on a signal output from the motion sensor 420, the HMD sensor 410, or the eye gaze sensor 140, and generates data for presenting a map object in response to the detection. The motion of the user 5 includes, for example, operation of the controller 300, change of the direction of the line of sight, and change of the posture. The change of the direction of the line of sight includes looking up or down in the panorama image 13. The change of the posture includes, for example, extending his or her body to look across an avatar object of another user present just in front of the line of sight of the user 5. When such a motion is detected, the map object is presented in the virtual space 11. With this configuration, the map object is presented in the virtual space 11 in synchronization with a usual motion of the user 5 in the real space. Therefore, implementing movement without impairing the sense of immersion into the virtual space 11 is possible.

In at least one aspect, the user 5 may look back depending on the situation of the virtual space 11. When the HMD 120 includes an acceleration sensor and the user 5 wearing the HMD 120 turns his or her head, a signal output from the acceleration sensor is input to the computer 200. The virtual object generation module 1425 generates data for presenting a map object including location options that are located backward of the current location of the user 5 based on the fact that the user 5 has looked backward, and outputs the data to the monitor 130. For example, in a case where the user 5 is at the front of a university classroom presented in the virtual space 11, when the user 5 turns his or her head backward, a map object representing seats located at the back of the classroom is presented so as to enter the field of view of the user 5. When the user 5 operates the controller 300 to select any one of the location options presented in the map object, the location option becomes a selected state. Then, when the user 5 performs an operation of establishing the selection, the selection of that location option is established. The virtual camera 14 is moved to the location, and the field-of-image generation module 1439 generates data for displaying an image as viewed from that location, and outputs the data to the monitor 130. The user 5 can look ahead from the back of the classroom.

In at least one aspect, the user 5 may be moved based on motions of the other users 5B to 5D sharing the virtual space 11. For example, when an avatar object corresponding to the user 5B moves to a new location in the virtual space 11, the avatar object is presented at the new location in a field-of-view image visually recognized by the user 5. At this point in time, location options selectable by the user 5 are changed, and thus the virtual object generation module 1425 may generate a map object having updated location options for presentation in the virtual space 11 in order to induce the user 5 to select a new location option. The user 5 can select a movement location based on the map object, and thus duplication of movement with the other users 5B to 5D is prevented.

In at least one aspect, the map object generated by the virtual object generation module 1425 includes the viewpoint position of the user 5 and the positions of the other users 5B to 5D sharing the virtual space 11 in the virtual space 11. The viewpoint position of the user 5 and the positions of the other users 5B to 5D may be displayed in different modes. The movement management module 1427 receives selection of a location option that excludes the viewpoint position of the user 5 and the positions of the other users 5B to 5D. In this manner, the user 5 can select a movement destination while recognizing his or her own position.

In at least one aspect, the virtual object generation module 1425 generates data for presenting an object (e.g., arrow object) indicating a direction of existence of the map object after the viewpoint of the user 5 has moved in the virtual space 11. When the arrow object is presented in the virtual space 11, the user 5 can check the location of the map object by looking at the arrow object even after movement in the virtual space 11. Therefore, the user 5 can easily grasp the position after movement.

In at least one aspect, the movement management module 1427 records a movement path of the viewpoint of the user 5 in the virtual space 11 into the memory module 530. The virtual object generation module 1425 generates, based on an operation by the user 5, data for presenting a path object indicating the movement path in the virtual space 11 using history data stored in the memory module 530. The history data is stored in the server 600, and is transmitted from the server 600 to the computer 200 in response to a request of the computer 200. When the field-of-image generation module 1439 outputs the generated data to the monitor 130, an object representing movement in the virtual space 11 is presented. The object is displayed as, for example, a polyline connecting points. The points each indicate a location in the virtual space. The line includes an arrow, and the arrow indicates the order of movement. When the user 5 visually recognizes the object, the user 5 can check the locus of his or her movement in the virtual space 11. The field-of-image generation module 1439 may generate an image in which the viewpoint of the user 5 is returned to a position before movement based on an operation by the user 5. With this, the user 5 can easily cancel movement also in the virtual space 11.

The chat control module 1428 controls communication via the virtual space. In at least one aspect, the chat control module 1428 reads a chat application from the memory module 530 based on an operation by the user 5 or a request for starting a chat transmitted by another computer 200B, to thereby start communication via the virtual space 11. When the user 5 performs a login operation, e.g., inputs a user ID and a password into the computer 200, the user 5 is associated with a session (also referred to as "room") of a chat as one member of the chat via the virtual space 11. After that, when the user 5B using the computer 200B logs in to the chat of the session, the user 5 and the user 5B are associated with each other as members of the chat. When the chat control module 1428 identifies the user 5B of the computer 200B, who is to be a communication partner of the computer 200, the virtual object generation module 1425 uses the object information 1432 to generate data for presenting an avatar object corresponding to the user 5B, and outputs the data to the HMD 120. When the HMD 120 displays the avatar object corresponding to the user 5B on the monitor 130 based on the data, the user 5 wearing the HMD 120 recognizes the avatar object in the virtual space 11.

In at least one embodiment of this disclosure, the chat control module 1428 waits for input of sound data that is based on a detected utterance of the user 5 and input of data from the eye gaze sensor 140. When the user 5 performs an operation (e.g., operation of controller, gesture, selection by voice, or gaze by line of sight) for selecting an avatar object in the virtual space 11, the chat control module 1428 detects, based on the operation, the fact that the user (e.g., user 5) corresponding to the avatar object is selected as the chat partner. When the chat control module 1428 detects utterance of the user 5, the chat control module 1428 transmits sound data that is based on a signal transmitted by the microphone 170 and eye tracking data that is based on a signal transmitted by the eye gaze sensor 140 to the computer 200B via the communication control module 240 based on a network address of the computer 200B used by the user 5B. The computer 200B updates the line of sight of the avatar object of the user 5 based on the eye tracking data, and transmits the sound data to the HMD 120B. When the computer 200B has a synchronization function, the line of sight of the avatar object is changed on the monitor 130 and sound is output from the speaker 180 substantially at the same timing, and thus the user 5B is less likely to feel strange.

The space information 1431 stores one or more templates that are defined to provide the virtual space 11.

The object information 1432 stores data for displaying an avatar object to be used for communication via the virtual space 11, content to be reproduced in the virtual space 11, and information for arranging an object to be used in the content. The content may include, for example, game content and content representing landscapes that resemble those of the real society. The data for displaying an avatar object may contain, for example, image data schematically representing a communication partner who is established as a chat partner in advance, and a photograph of the communication partner.

The user information 1433 stores, for example, a program for causing the computer 200 to function as a control device for the HMD set 110, an application program that uses each piece of content stored in the object information 1432, and a user ID and a password that are, in some instances, required to execute the application program. The data and programs stored in the memory module 530 are input by the user 5 of the HMD 120. Alternatively, the processor 210 downloads programs or data from a computer (e.g., server 600) that is managed by a business operator providing the content, and stores the downloaded programs or data into the memory module 530.

The avatar position information 1434 contains position information on avatar objects used by respective users sharing the virtual space 11. In at least one aspect, the position information is managed by the server 600. After each user logs in to a room for a chat, when each user performs an operation of moving an avatar object in the virtual space 11, the position information on the avatar object is updated. The data structure of the server 600 is described later.

[Operation Between Computers Through Communication Between Two Users]

Now, a description is given of operation of the computers 200A and 200B at the time when the two users 5A and 5B communicate to/from each other via the virtual space 11. In the following, a description is given of a case in which the user 5B wearing the HMD 120B connected to the computer 200B utters sound toward the user 5A wearing the HMD 120A connected to the computer 200A.

(Transmission Side)

In at least one aspect, the user 5B wearing the HMD 120B utters sound toward the microphone 170 in order to chat with the user 5A. The sound signal of the utterance is transmitted to the computer 200B connected to the HMD 120B. The sound control module 1429 converts the sound signal into sound data, and associates a timestamp representing the time of detection of the utterance with the sound data. The timestamp is, for example, time data of an internal clock of the processor 210B. In at least one aspect, time data on a time when the communication control module 240 converts the sound signal into sound data is used as the timestamp.

When the user 5B is uttering sound, a motion of the line of sight of the user 5B is detected by the eye gaze sensor 140. The result (eye tracking data) of detection by the eye gaze sensor 140 is transmitted to the computer 200B. The line-of-sight detection module 1426 identifies each position (e.g., position of pupil) representing a change in line of sight of the user 5B based on the detection result.

The computer 200B transmits the sound data and the eye tracking data to the computer 200A. The sound data and the eye tracking data are first transmitted to the server 600. The server 600 refers to a destination of each header of the sound data and the eye tracking data, and transmits the sound data and the eye tracking data to the computer 200A. At this time, the sound data and the eye tracking data may arrive at the computer 200A at different times.

(Reception Side)

The computer 200A receives the data transmitted by the computer 200B from the server 600. In at least one aspect, the processor 210A of the computer 200A detects reception of the sound data based on the data transmitted by the communication control module 240. When the processor 210A identifies the transmission source (i.e., computer 200B) of the sound data, the processor 210A serves as the chat control module 1428 to cause a chat screen to be displayed on the monitor 130 of the HMD 120A.

The processor 210A further detects reception of the eye tracking data. When the processor 210A identifies a transmission source (i.e., computer 200B) of the eye tracking data, the processor 210 serves as the virtual object generation module 1425 to generate data for displaying the avatar object of the user 5B.

In at least one aspect, the processor 210A may receive eye tracking data before reception of sound data. In this case, when detecting the transmission source identification number from the eye tracking data, the processor 210A determines that there is sound data transmitted in association with the eye tracking data. The processor 210A waits to output data for displaying an avatar object until the processor 210A receives sound data containing the same transmission source identification number and time data as the transmission source identification number and time data contained in the eye tracking data.

Further, in at least one aspect, the processor 210A may receive sound data before reception of eye tracking data. In this case, when detecting the transmission source identification number from the sound data, the processor 210A determines that there is eye tracking data transmitted in association with the sound data. The processor 210A waits to output the sound data until the processor 210A receives eye tracking data containing the same transmission source identification number and time data as the transmission source identification number and time data contained in the sound data.

In each aspect described above, pieces of time data to be compared may not completely indicate the same time.

When confirming reception of sound data and eye tracking data containing the same time data, the processor 210A outputs the sound data to the speaker 180, and outputs, to the monitor 130, data for displaying an avatar object in which the change that is based on the eye tracking data is translated. As a result, the user 5 can recognize the sound uttered by the user 5B and the avatar at the same timing, and thus can enjoy a chat without feeling a time lag (e.g., deviation between change in avatar object and timing of outputting sound) due to delay of signal transmission.

In the same manner as in the processing described above, the processor 210B of the computer 200B used by the user 5B can also synchronize the timing of outputting sound data and the timing of outputting an avatar object in which the movement of the line of sight of the user 5 is translated. As a result, the user 5B can also recognize output of the sound uttered by the user 5A and the change in avatar object at the same timing, and thus can enjoy a chat without feeling a time lag due to delay of signal transmission.

[Data Structure of Server]

With reference to FIG. 15, a description is given of a data structure of the server 600. FIG. 15 is a diagram of a mode of storage of data in the memory 620 included in the server 600 according to at least one embodiment of this disclosure. The memory 620 stores tables 1510, 1520, and 1530.

The table 1510 contains data records of one or more users sharing the virtual space 11 by using a VR chat. Specifically, the table 1510 contains a user ID 1511, a name 1512, a login status 1513, a seating status 1514, a seating location 1515, and position information 1516. The user ID 1511 represents a user registered to be capable of sharing the virtual space 11. The name 1512 represents the name of each user. The login status 1513 represents whether or not each user is logged in. For example, the login status 1513 represents whether or not each user shares the virtual space 11 at some point in time. The seating status 1514 represents the seating status of each user at a location option presented in the virtual space 11. The location option represents a seat in, for example, a conference room, a movie theater, or a theater. The position information 1516 represents a location of the user in the virtual space 11.

The table 1520 represents the usage status of each location option. The table 1520 is used to represent the status of the map object. The table 1520 includes a location option 1521 and a status 1522. The location option 1521 specifies each location provided in the virtual space 11. For example, seats may be specified in a manner that resembles that of a movie theater or a theater. In at least one aspect, when seats are arranged to surround a table in a conference room, numbers are used in an ascending order of 1, 2, 3, . . . , n, or in a descending order of n, n−1, . . . , 1.

The table 1530 stores history information on movement of each user in the virtual space 11. The table 1530 contains a record number 1531, a user ID 1532, position information 1533, and time information 1534. The record number 1531 identifies a movement event that has occurred in a session that used the virtual space 11 in at least one aspect. The user ID 1532 identifies a user who has moved in the session. The position information 1533 identifies a position of the user in the virtual space 11. In at least one aspect, the position information 1533 is represented based on three-dimensional coordinate axes (x, y, z) in the virtual space 11. The time information 1534 represents a timing at which the user has moved to a position indicated by the position information 1533.

When the server 600 detects movement of each user in the virtual space 11, the memory 620 accumulates data in the movement history. The movement path is identified by connecting location points identified by the history of each movement. In at least one aspect, the server 600 transmits data representing the movement path to the computer 200. The computer 200 can present a path object representing the movement path in the virtual space 11 based on the data. When the user 5 recognizes the path object, the user 5 can select a location before movement as necessary, and return to the location before movement.

[Control Structure]

Figure 16:
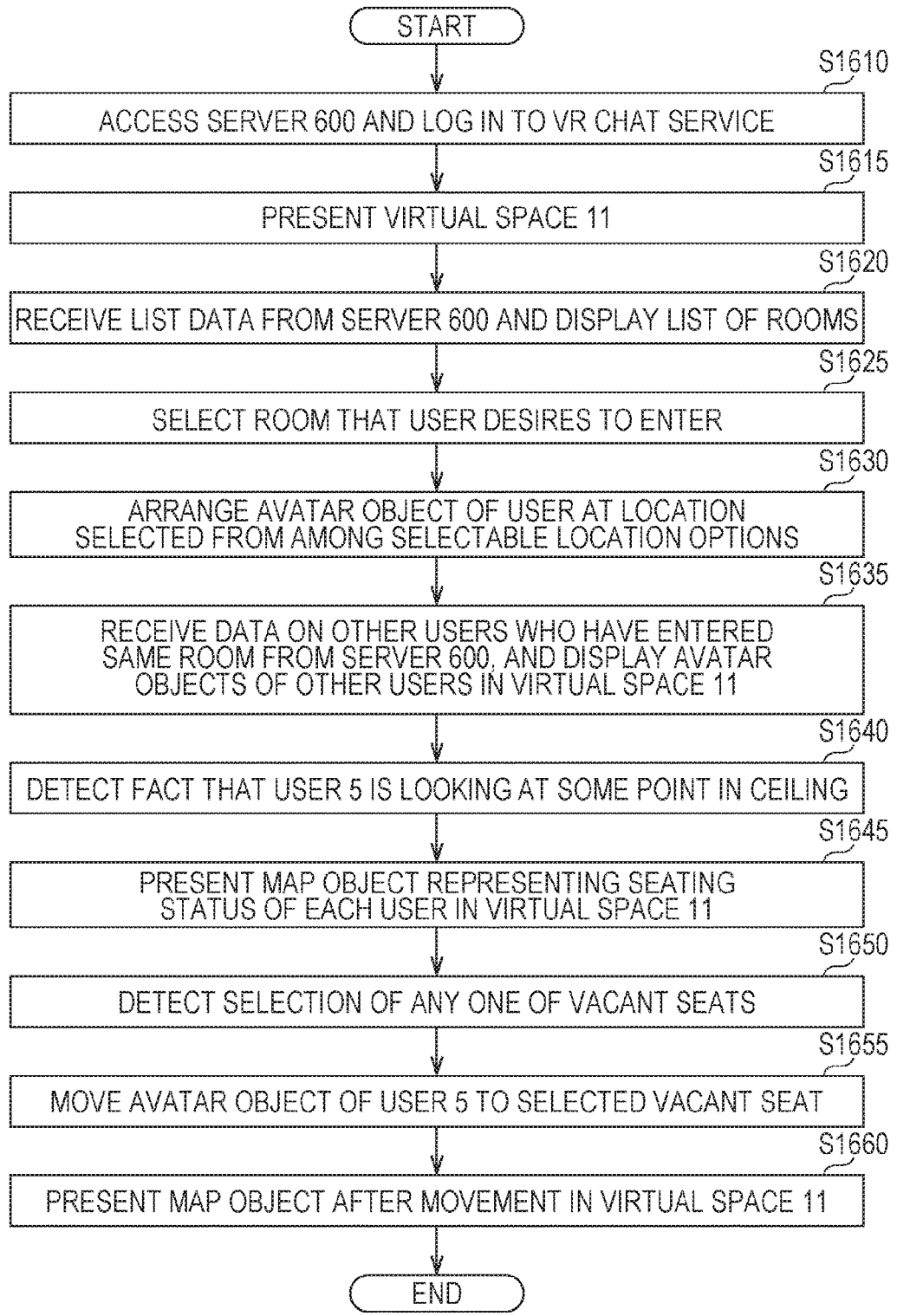
FIG. 16 A flowchart of processing to be executed by a processor according to at least one embodiment of this disclosure.

With reference to FIG. 16, a description is given of a control structure of the computer 200. FIG. 16 is a flowchart of processing to be executed by the processor 210 of the computer 200 according to at least one embodiment of this disclosure.

In Step S1610, the processor 210 serves as the control module 510 to access the server 600 and display a service menu provided in the virtual space 11 on the monitor 130 based on an operation by the user 5. Further, the processor 210 logs in to a VR chat service selected by the user 5.

In Step S1615, the processor 210 serves as the control module 510 to transmit data for presenting the virtual space 11 on the HMD 120. The user 5 wearing the HMD 120 recognizes the virtual space 11 via the monitor 130.

In Step S1620, the processor 210 serves as the chat control module 1428 to receive list data from the server 600, and outputs the received list data to the HMD 120. When the monitor 130 displays a list of rooms based on the list data, the user 5 recognizes the list of rooms presented in the virtual space 11.

In Step S1625, the processor 210 serves as the chat control module 1428 to select a room that the user 5 desires to enter based on an operation by the user 5. For example, the user 5 can select a room using the controller 300. In at least one aspect, when the user 5 keeps directing his or her line of sight toward any one of objects representing each room, the room is selected and the selection is established. In other cases, when a room is selected, the user enters the selected room. The HMD 120 presents a space after the user 5 has entered the room in the virtual space 11. The processor 210 arranges the virtual camera 14 at an initial position determined in advance. This initial position is a viewpoint of the user 5. The virtual space 11 may include a location option selectable by the user 5 in addition to an initial position. The user 5 can select any one of location options by keeping looking at the location option or operating the controller 300. For example, the user 5 can select a movement destination location as long as there exists no avatar object of another user at that location in the virtual space 11.

In Step S1630, the processor 210 serves as the movement management module 1427 to arrange the avatar object of the user 5 at a location corresponding to the selected location option. After that, when another user logs in to the same room, a computer used by another user transmits data on the login to the server 600. The data contains a user ID, an initial position, and image data on the avatar object (or ID of avatar object).

In Step S1635, the processor 210 serves as the chat control module 1428 to receive data on other users who have entered the same room from the server 600, and presents avatar objects of the other users in the virtual space 11. Similarly to the case of the user 5, the avatar objects of the other users are arranged at locations where the avatar object of the user 5 is not arranged.

In Step S1640, the processor 210 serves as the line-of-sight detection module 1426 to detect the fact that the user 5 is looking at some point in a ceiling based on a signal output from the eye gaze sensor 140. Step S1640 is not limited to detecting a line of sight directed at a point in the ceiling and is applicable to detecting a line of sight directed to other locations in the virtual space 11. The processor 210 transmits, to the server 600, a request for transmitting information representing a situation of arrangement of avatar objects in response to the detection. The server 600 reads the information (e.g., table 1510 of FIG. 15) from the memory 620 in response to the transmission request, and transmits the read information to the computer 200.

In Step S1645, the processor 210 serves as the control module 510 to present a map object representing a seating status of each user in the virtual space 11 based on the information received from the server 600.

In Step S1650, the processor 210 serves as the movement management module 1427 to detect selection of a vacant seat based on output from the controller 300 or a signal output from the eye gaze sensor 140. When an operation of establishing the selection, for example, pressing of a button or gazing for a fixed period of time, is performed, this vacant seat is determined as a location option serving as a movement destination of the avatar object of the user 5.

In Step S1655, the processor 210 serves as the movement management module 1427 to move the avatar object of the user 5 to the selected vacant seat. The location of the virtual camera 14 corresponds to the movement destination location of the avatar object. The information on the position after movement is transmitted from the computer 200 to the server 600. The processor 610 updates the table 1510, and stores the history into the table 1530.

In Step S1660, the processor 210 presents the map object, which is obtained after the avatar object of the user 5 is moved, in the virtual space 11. For example, the map object is presented in the virtual space 11 until a predetermined period of time (e.g., few seconds) have elapsed after the avatar object is moved, and after that, the presentation ends. With this, the user 5 can easily grasp his or her own position even after movement in the virtual space 11.

[Control Structure of Server]

Figure 17:
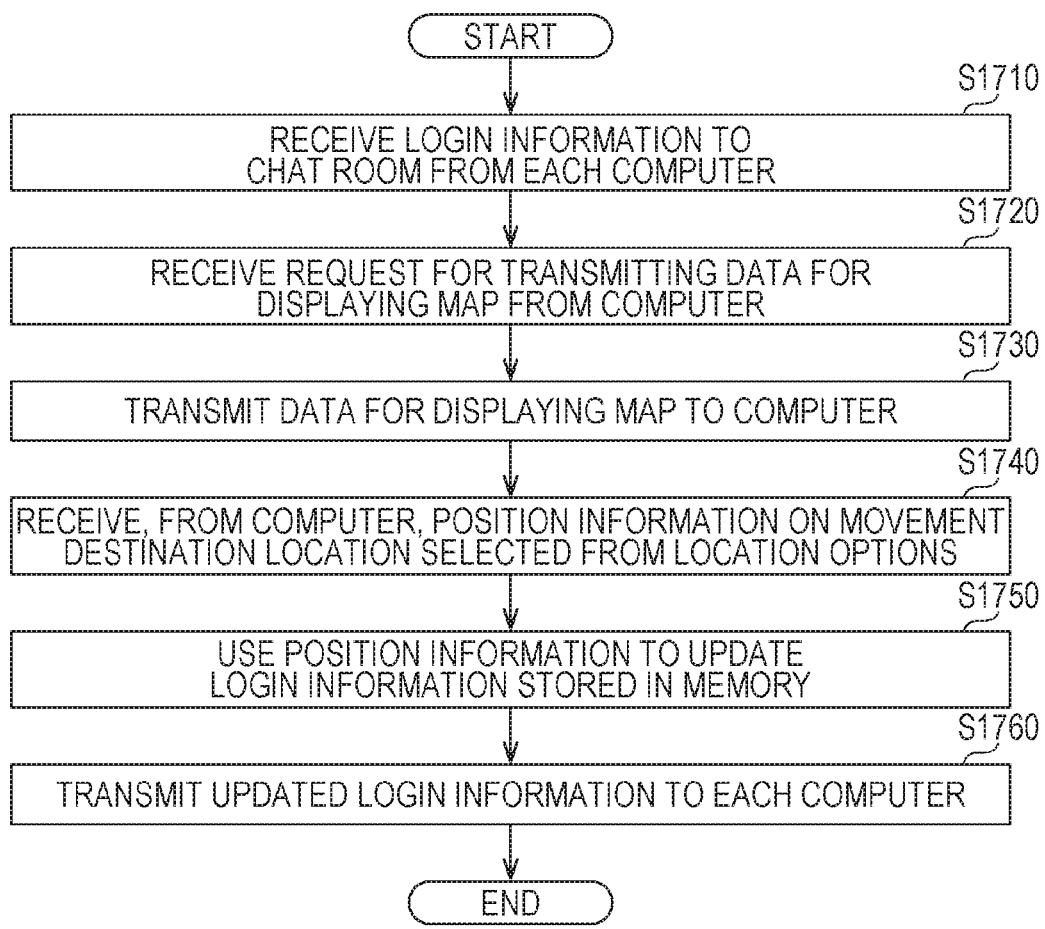
FIG. 17 A flowchart of processing to be executed by a processor according to at least one embodiment of this disclosure.

With reference to FIG. 17, a description is given of a control structure of the server 600. FIG. 17 is a flowchart of the processing to be executed by the processor 610 of the server 600 according to at least one embodiment of this disclosure.

In Step S1710, the processor 610 receives login information to a chat room from each computer. The reception timing differs depending on each user. The processor 610 stores the login information on each user into the memory 620, and updates the table 1510. The server 600 initializes the table 1520. The number of tables 1520 provided by the server 600 may correspond to the number of VR chat rooms provided by the server 600. For example, when four rooms are provided, a table that corresponds to each room is created.

In Step S1720, the processor 610 receives, from the computer 200, a request for transmitting data for displaying a map object. In at least one aspect, the data contains information representing an arrangement situation of each avatar object. In Step S1730, the processor 610 transmits data for displaying a map object to the computer in response to the transmission request.

In Step S1740, the processor 610 receives, from the computer 200, position information on a movement destination location selected from location options. In Step S1750, the processor 610 uses the position information to update the login information stored in the memory 620. More specifically, the processor 610 updates each item of the table 1510 and the table 1520. Further, the processor 610 stores the movement history of the user into the table 1530.

In Step S1760, the processor 610 transmits the updated login information, namely, pieces of data of the tables 1510 and 1520 to each computer. When the computer 200 receives the login information, the computer 200 updates the avatar position information 1434. The virtual object generation module 1425 uses the updated avatar position information 1434 to generate data for presenting a map object. The field-of-image generation module 1439 uses the data to generate data for displaying a field-of-view image, and outputs the generated data to the monitor 130. When the monitor 130 displays a map object that is based on the data, the user 5 can check his or her position after movement or the positions of the other users.

Figure 18:
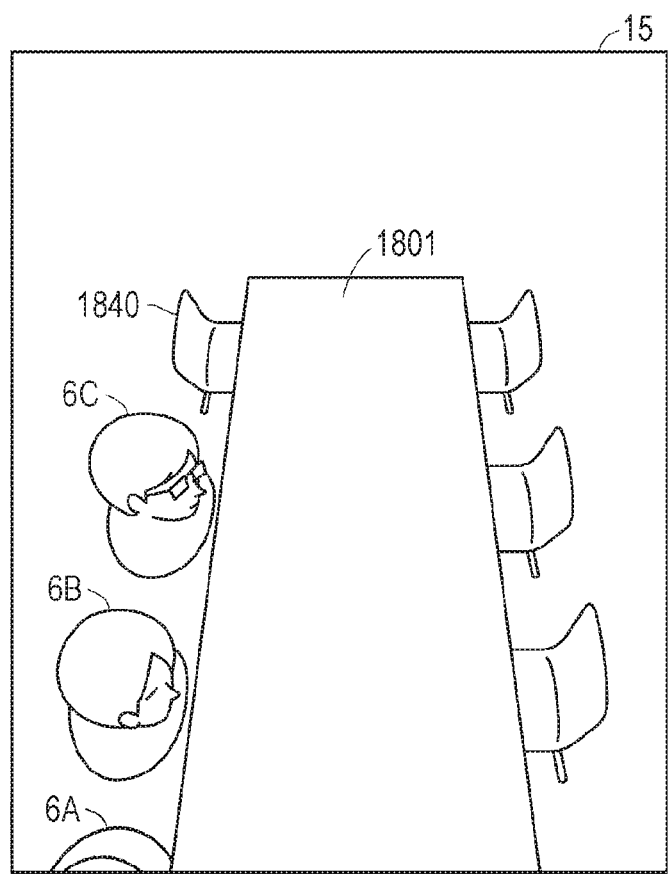
FIG. 18 A diagram of a field-of-view image according to at least one embodiment of this disclosure.
Figure 19:
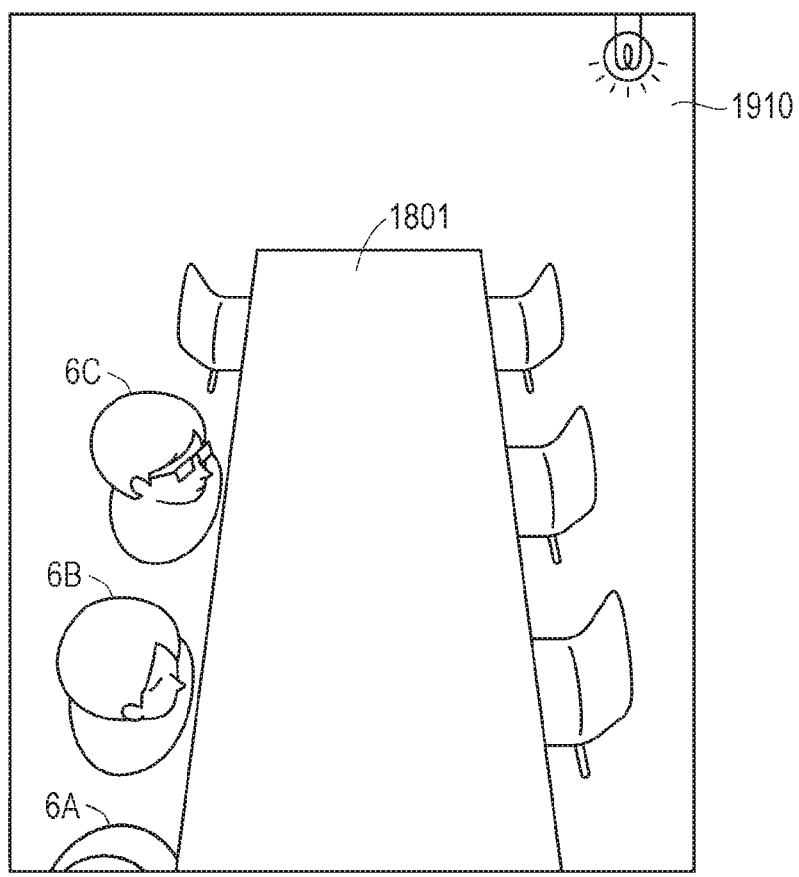
FIG. 19 A diagram of a state in which an object serving as a trigger for displaying a map object is presented according to at least one embodiment of this disclosure.

With reference to FIG. 18 to FIG. 22, a description is given of at least one aspect of the movement in the virtual space 11. FIG. 18 is a diagram of a field-of-view image 1817 according to at least one embodiment of this disclosure. FIG. 19 is a diagram of a state in which an object for displaying a map object is presented according to at least one embodiment of this disclosure. The field-of-view image 1817 is presented on the HMD 120 by login of the user 5A to the room. For example, the field-of-view image 1817 is presented when the user 5A has logged in to a room "conference room".

In FIG. 18, the field-of-view image 1817 contains an object 1801, an avatar object 6A, an avatar object 6B, an avatar object 6C, and an object 1840. The object 1801 corresponds to a virtually arranged table. The avatar object 6A corresponds to the user 5A. The avatar objects 6B and 6C correspond to the other users 5B and 5C, who have logged in to the same room. The object 1840 represents the chair of a vacant seat. The object 1840 is located within the line of sight of the user 5A, namely, within the line of sight of the virtual camera 14, and thus displayed on the field-of-view image 1817. There is a chair selectable by the user between the avatar object 6B and the avatar object 6C as well, but the chair is not visible from the avatar object 6A.

In FIG. 19, in at least one aspect, when the user 5A looks up in the conference room in the virtual space 11, an object 1910 is presented. The mode of the object 1910 is not particularly limited. The object 1910 may be an object such as a ball, a lamp, or a question mark, to attract the attention of each user in the virtual space 11. Such an object may be transparent, or may flash. When the user 5A selects or keeps looking at the object 1910, the movement management module 1427 detects selection of the object 1910. The virtual object generation module 1425 generates data for presenting the map object based on the result of detection, and the field-of-image generation module 1439 outputs the data to the monitor 130.

Figure 20:
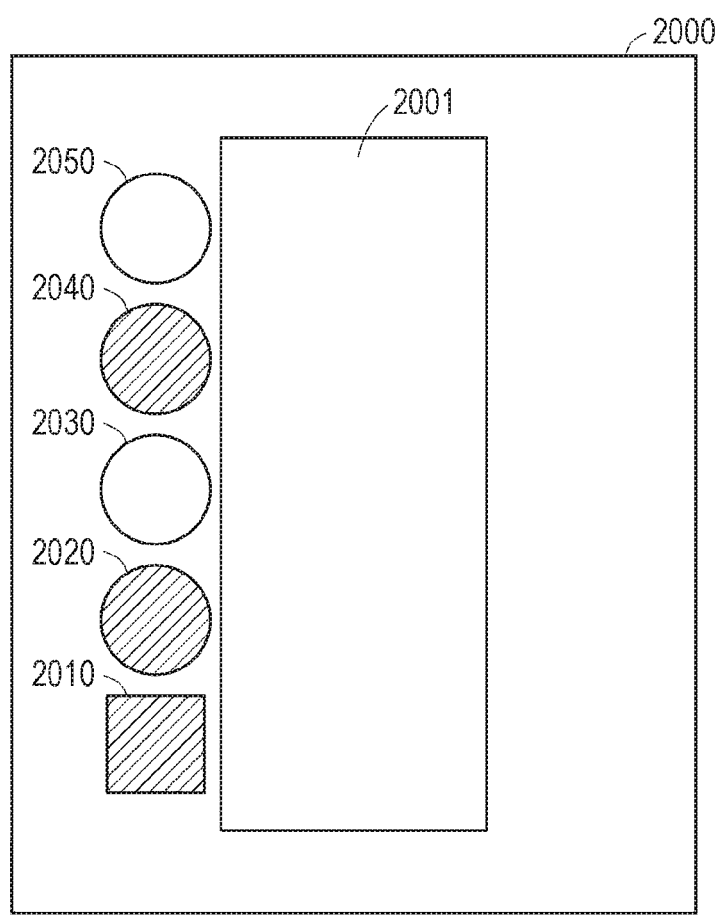
FIG. 20 A diagram of one mode of a map object according to at least one embodiment of this disclosure.

FIG. 20 is a diagram of a mode of a map object 2000 according to at least one embodiment of this disclosure. The map object 2000 contains images 2001, 2010, 2020, 2030, 2040, and 2050. The image 2001 corresponds to the object 1801. The image 2010 corresponds to the user 5A in the virtual space 11. The images 2020 and 2040 correspond to the objects 6B and 6C representing other users, respectively. The images 2030 and 2050 represent vacant seats. Among those images, the image 2050 corresponds to the object 1840. The image 2050 corresponds to a chair that is not located within the field of view of the user 5A in FIG. 18 or FIG. 19. The images 2030 and 2050 are displayed in modes different from display modes of the images 2010, 2020, and 2040. Thus, the user 5A can easily recognize selectable location options. In at least one aspect, the user 5A can operate the controller 300 to select the image 2030, namely, a movement destination location. In at least one aspect, when the user 5A keeps looking at the image 2030, the image 2030 is selected as a movement destination location, and the selection may be established when the user 5A keeps looking at the image 2030 for a longer period of time. The user 5A moves to the location identified by the image 2030.

Figure 21:
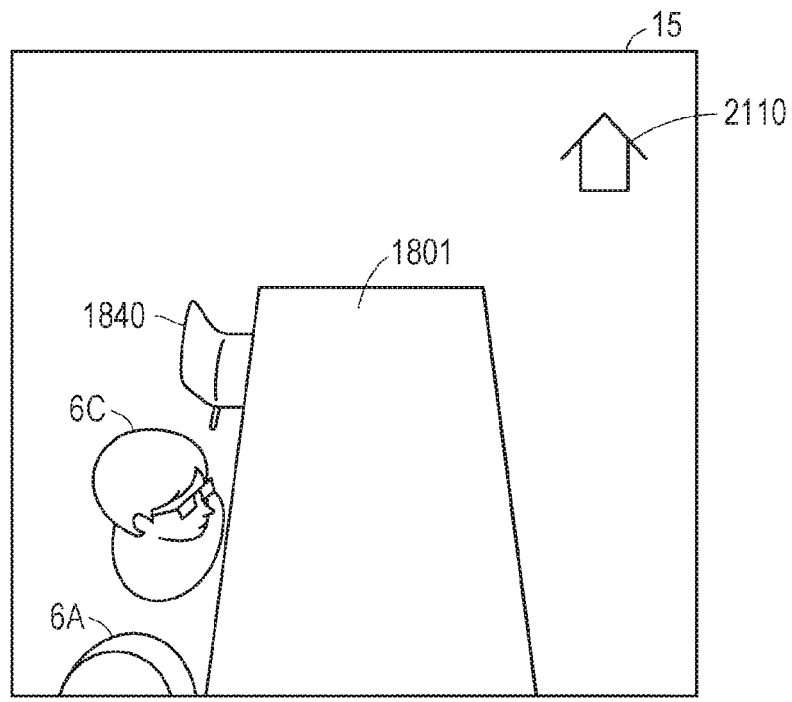
FIG. 21 A diagram of a field-of-view region to be visually recognized at a location to which a user has moved according to at least one embodiment of this disclosure.

FIG. 21 is a diagram of the field-of-view region 15 to be visually recognized at a location to which the user 5 has moved in the virtual space 11 according to at least one embodiment of this disclosure. The object 6A corresponds to the user 5A. Therefore, the user 5 can understand the fact that the user 5 has moved to a seat on the right of the object 6C. In at least one aspect, the processor 210 presents an object 2110 representing an arrow in the field-of-view region 15. The object 2110 represents the fact that the object 1910 for movement has been presented in a direction indicated by the arrow. The user 5 can recognize the object 2110, to thereby check the current position after movement.

Figure 22:
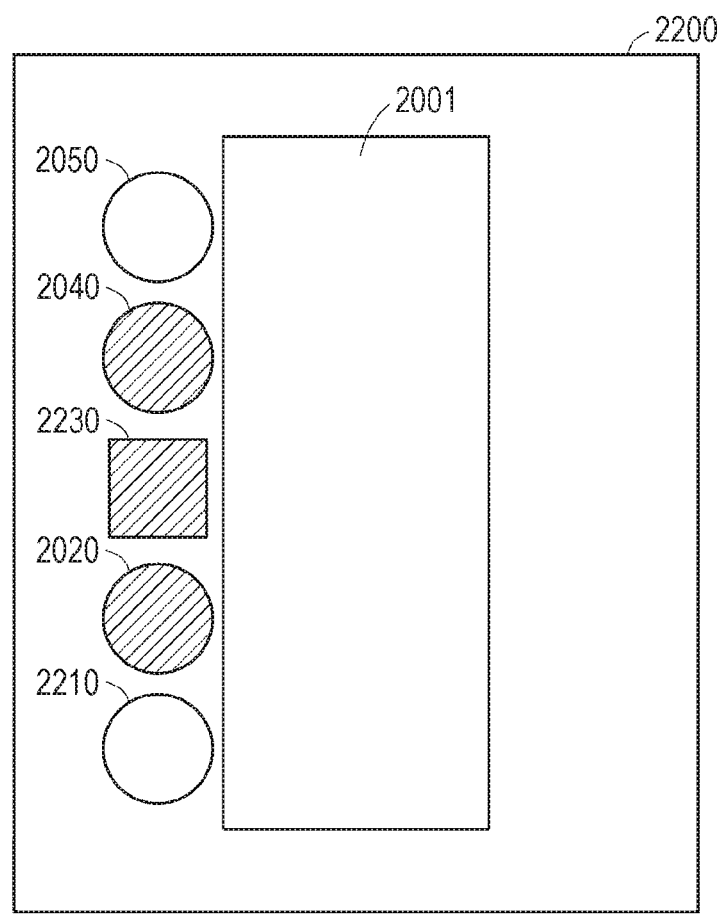
FIG. 22 A diagram of a mode of the map object according to at least one embodiment of this disclosure.

FIG. 22 is a diagram of a mode of the map object 2000 to be presented according to at least one embodiment of this disclosure. The map object 2200 is presented at a location determined in advance for a predetermined period of time after the user 5 has moved in the virtual space 11. The location determined in advance includes, for example, an upper position in the field-of-view region 15 and a back surface of an object that is arranged last in the field-of-view region 15. The map object 2200 may be transparent. With this, visibility in the field-of-view region 15 is less likely to be hindered, and thus the user 5 can easily grasp the current location after movement in the virtual space 11. FIGS. 20 and 22 distinguish between a location occupied by the avatar object of the user 5 and other avatar objects based on different shapes for the corresponding images. In at least one embodiment, a map object distinguishes between locations occupied by different avatar objects based on distinguishing features other than shapes, such as color, shading, transparency, etc. FIGS. 20 and 22 distinguish between a location occupied by other avatar objects and vacant locations based on shading. In at least one embodiment, a map object distinguishes between locations of avatar objects and vacant locations based on distinguishing features other than shading, such as shape, color, transparency, etc.

Figure 23:
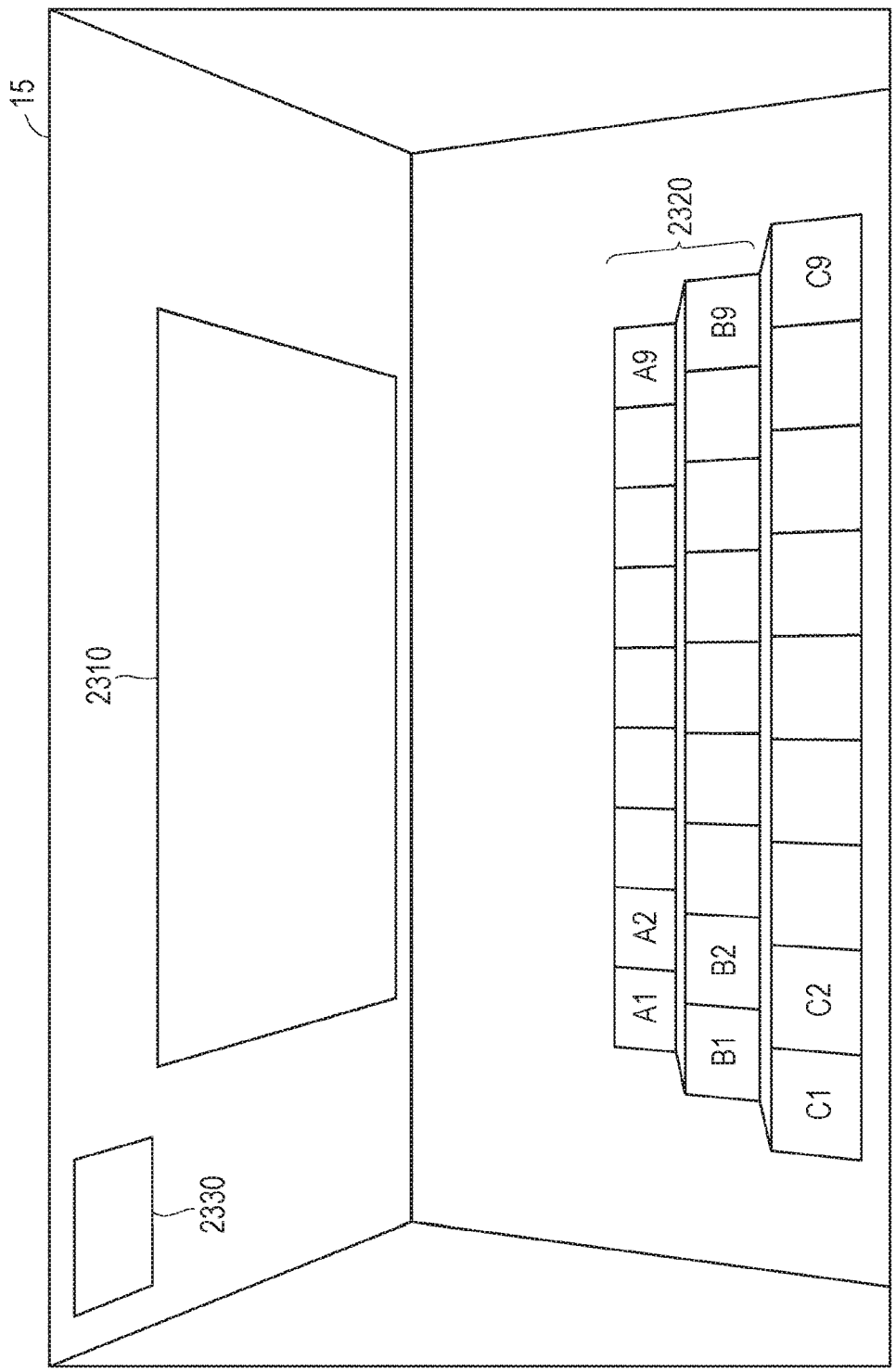
FIG. 23 A diagram of a field-of-view image according to at least one embodiment of this disclosure.
Figure 24:
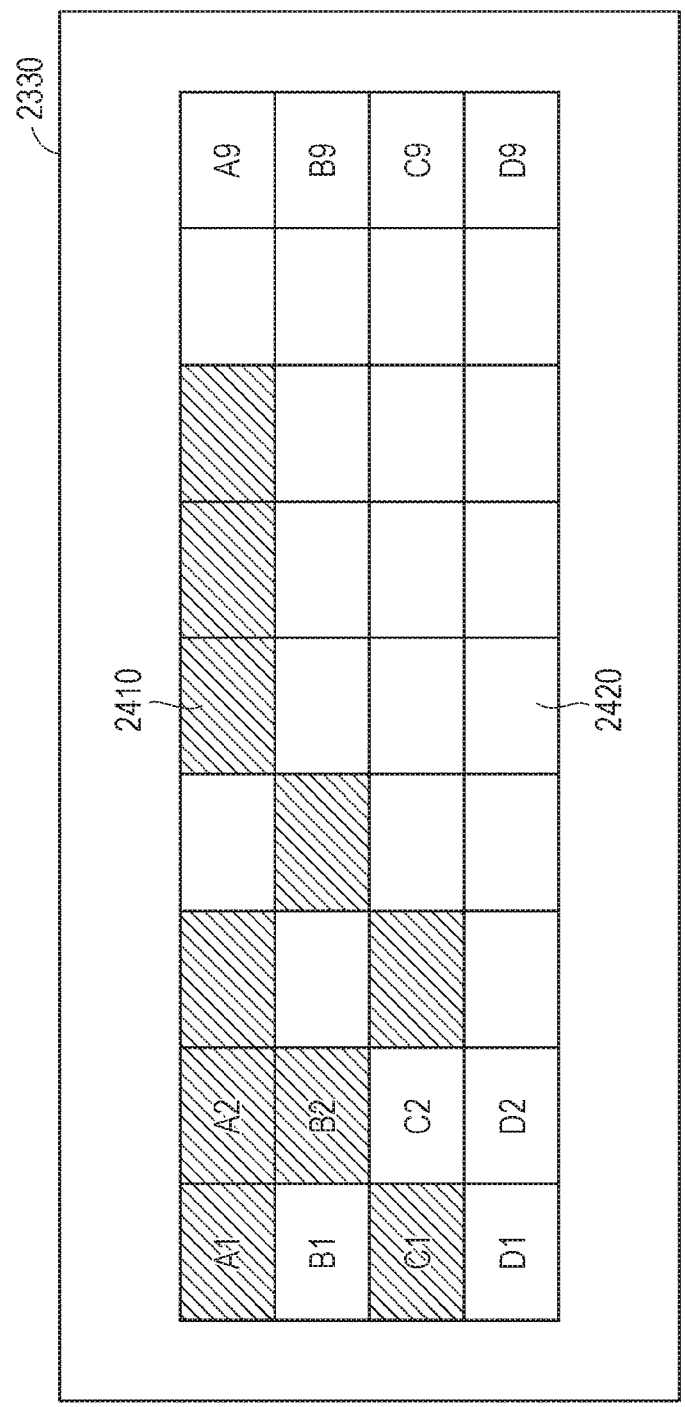
FIG. 24 A diagram of a map object according to at least one embodiment of this disclosure.

With reference to FIG. 23 and FIG. 24, a description is further given of movement in the virtual space 11. FIG. 23 is a diagram of a field-of-view image 2300 according to at least one embodiment of this disclosure. The field-of-view image 2300 is, for example, a theater in the virtual space 11. The field-of-view image 2300 includes a screen object 2310 and a seat object 2320. As described above, when the user 5 keeps looking at a location determined in advance, a map object 2330 is presented.

FIG. 24 is a diagram of the map object 2330 according to at least one embodiment of this disclosure. In the seat object 2320, the map object 2330 includes seats. Apart of those seats may already be occupied by another user. Thus, in FIG. 24, vacant seats and used seats are distinguished from one another in the map object 2330. For example, a region 2410 represents the fact that a seat is already used. The seat at this time is managed by the server 600 as A5 (seat 5 in row A). Similarly, other hatched regions are already used. An unhatched region, for example, a region 2420, represents the fact that the seat is not occupied. Thus, each user can select the seat as the movement destination in the virtual space 11.

Figure 25:
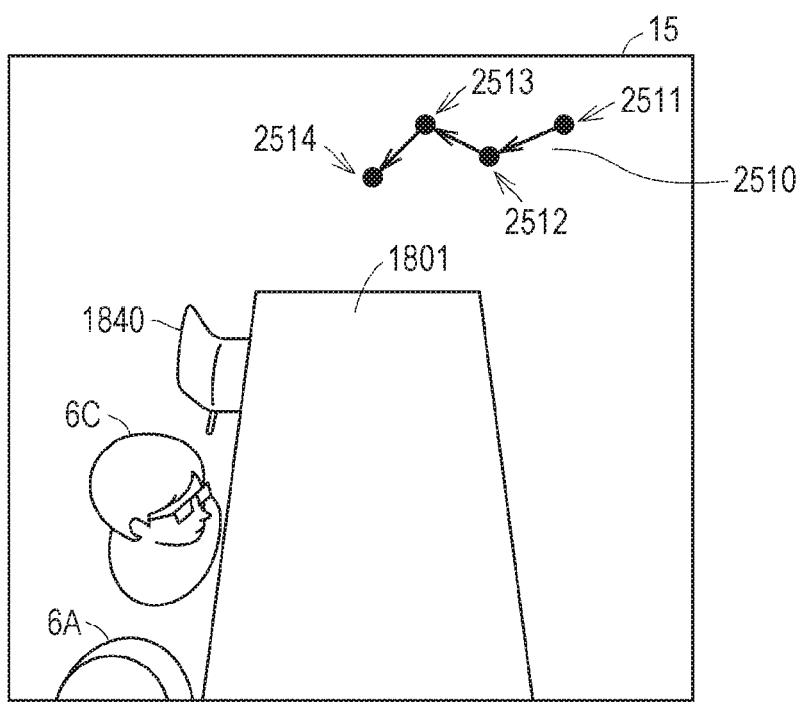
FIG. 25 A diagram of a state in which a history of movement in a virtual space is presented according to at least one embodiment of this disclosure.

With reference to FIG. 25, a description is given of presentation of a history of movement in the virtual space 11. FIG. 25 is a diagram of a state in which a history of movement in the virtual space 11 is presented according to at least one embodiment of this disclosure. In at least one aspect, the processor 210 may present a polyline object 2510 based on data of the table 1530 stored in the server 600. The polyline object 2510 represents the fact that the user 5 wearing the HMD 120 has moved in the virtual space 11. The polyline object 2510 contains points 2511, 2512, 2513, and 2514. Those points are connected by arrows. The points are associated with pieces of position information. The polyline object 2510 represents the fact that the user 5 has moved in the order of the point 2511, the point 2512, the point 2513, and the point 2514 in the virtual space 11, and the fact that the current location of the user 5 is identified by the point 2514.

For example, the polyline object 2510 is presented in the virtual space 11 when presentation of the history is set on. When the user 5 selects any one of points other than the point 2514 indicating the current location in the polyline object 2510, the user 5 can return to the selected point. Alternatively, in at least one aspect, the user 5 selects an arrow instead of selecting a point. Also in this case, the user 5 moves to a point corresponding to a starting point of the selected arrow. With such a configuration, movement can be canceled when grasp of the current position becomes difficult in the virtual space 11. Therefore, convenience of movement in the virtual space 11 becomes less likely to be impaired.

As described above, according to at least one embodiment of this disclosure, the map object representing a vacant state of a seat is presented in the virtual space 11, and thus the user 5 can refer to the map object to easily move to a location that cannot be visually recognized in the virtual space 11.

SUMMARY

The technical features described above in detail may be summarized as follows.

[Configuration 1]

According to at least one embodiment of this disclosure, there is provided a method to be executed on a computer 200 to move in a virtual space 11 provided by an HMD 120. This method includes defining the virtual space 11. The method further includes arranging an object (e.g., objects 6B, 6C, 1840, and 1910) visually recognizable by a user 5 of the HMD 120 in the virtual space 11. The method further includes presenting a map object 2330 including one or more location options selectable by the user 5 in the virtual space 11. The method further includes receiving selection of any one of the one or more location options included in the map object 2330. The method further includes moving a viewpoint of the user 5 in the virtual space 11 to the selected one of the one or more location options.

[Configuration 2]

According to at least one embodiment of this disclosure, the presenting of the map object 2330 includes presenting the map object 2330 based on a motion of the user 5. For example, when the user 5 performs a motion of looking up in the virtual space 11, that motion triggers presentation of a menu. Therefore, movement in the virtual space 11 without a complicated operation is possible.

[Configuration 3]

According to at least one embodiment of this disclosure, the motion of the user 5 includes changing a direction of a line of sight by the user 5. The presenting of the map object 2330 includes presenting the map object 2330 when the user 5 has changed the direction of the line of sight. With such a configuration, the user 5 may move in the virtual space 11 with a natural motion.

[Configuration 4]

According to at least one embodiment of this disclosure, the changing of the direction of the line of sight by the user 5 includes moving the line of sight of the user 5 toward an upper direction. The presenting of the map object includes presenting the map object when the line of sight of the user 5 has moved toward the upper direction. For example, when the user 5 looks up, a transparent ball is displayed. When the user 5 keeps looking at the ball, a location option to which the user 5 can move may be displayed. With this, a movement destination option is easily presented, and thus a complicated operation is avoided.

[Configuration 5]

According to at least one embodiment of this disclosure, the changing of the direction of the line of sight by the user 5 includes moving the line of sight toward a rear direction by the user 5. The presenting of the map object 2330 includes presenting the map object including a location option that is located at the back of a current location of the user 5 based on the user 5 looking backward. With such a configuration, the user 5 can easily move even when the user 5 moves backward from the current location in the virtual space 11.

[Configuration 6]

According to at least one embodiment of this disclosure, the method further includes detecting a motion of the HMD 120. The presenting of the map object 2330 includes presenting the map object 2330 when the HMD 120 has moved. With such a configuration, for example, the map object 2330 is presented even when the head (HMD) of the user 5 has moved (e.g., turned left or right), and thus the user 5 can move in accordance with the intention of the user 5.

[Configuration 7]

According to at least one embodiment of this disclosure, the method further includes establishing communication to/from other users 5B and 5C via the virtual space 11. The arranging of the object includes arranging avatar objects 6B and 6C representing the other users 5B and 5C. The presenting of the map object 2330 includes presenting the map object 2330 based on the motions of the other users 5B and 5C. With such a configuration, the map object 2330 is presented in the field-of-view region 15 of the user 5B based on the motions of the users 5B and 5C serving as communication partners. Therefore, the trigger for movement in the virtual space 11 may be diversified.

[Configuration 8]

According to at least one embodiment of this disclosure, the presenting of the map object 2330 includes presenting (FIG. 20) a position of the viewpoint of the user 5 in the virtual space 11 and positions of the other users 5B and 5C sharing the virtual space 11. The receiving of the selection includes receiving selection of a location option where the viewpoint of the user 5 and the other users 5B and 5C are not present. With such a configuration, the user 5 can select a location where the other users 5B and 5C are not present.

[Configuration 9]

According to at least one embodiment of this disclosure, the method further includes presenting an object 2110 indicating a direction in which an avatar object is present after movement of the viewpoint of the user 5 in the virtual space 11. With such a configuration, the direction of an indicator serving as a mark is presented after movement in the virtual space 11. Therefore, the user 5 can easily check the current position even after movement.

[Configuration 10]

According to at least one embodiment of this disclosure, the method further includes recording a movement path of the viewpoint of the user 5 in the virtual space 11. The method further includes presenting an object (e.g., polyline object 2510) representing the movement path in the virtual space 11. With such a configuration, the movement locus is presented in the virtual space 11, and thus the user 5 can easily return to a position before movement as desired.

[Configuration 11]

According to at least one embodiment of this disclosure, the method further includes receiving an instruction to cancel movement of the viewpoint of the user 5 in the virtual space 11. The method further includes returning the viewpoint of the user 5 to the location before movement based on the instruction. With such a configuration, the user 5 can easily return to an original position also in the virtual space 11.

[Configuration 12]

According to at least one embodiment of this disclosure, the receiving of the instruction to cancel the movement includes receiving an operation to select a movement path included in a path object. With such a configuration, the user 5 can easily return to the position before movement simply by selecting a path presented in the virtual space 11.

[Configuration 13]

According to at least one embodiment of this disclosure, the receiving of the operation to select the movement path includes detecting a line of sight directed toward the movement path included in the path object. With such a configuration, the path can be selected by the line of sight without using a hand, and thus a wider variety of operation methods for canceling movement are obtained.

The embodiments disclosed herein are merely examples in all aspects and in no way intended to limit this disclosure.

The scope of this disclosure is defined by the appended claims and not by the above description, and this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

What is claimed is:

1. A method, comprising:
    defining a virtual space,
        wherein the virtual space comprises a viewpoint associated with a first user, a first object, and a map object, and
        wherein a plurality of location options is associated with the map object;
    defining a visual field based on a position of the viewpoint in the virtual space;
    generating a visual-field image based on the visual field;
    displaying the map object in the visual field in response to detection of a predetermined motion;
    identifying occupied location options from the plurality of location options;
    receiving a selection of any location option of the plurality of location options by the first user, wherein the receiving the selection comprises preventing the first user from selecting any location option of the plurality of location options identified as occupied;
    moving the viewpoint to the selected location option; and
    updating the visual field based on a position of the selected viewpoint in the virtual space.

2. The method according to claim 1, further comprising:
    hiding the map object from the first user prior to displaying the map object in the visual field.

3. The method according to claim 1,
    wherein the predetermined motion comprises changing a direction of a line of sight of the first user, and
    wherein the method further comprises displaying the map object in the visual field in response to the change of the direction of the line of sight.

4. The method according to claim 3, further comprising displaying the map object in the visual field in response to the line of sight being directed toward an upper direction in the virtual space.

5. The method according to claim 3, further comprising:
    defining a front and a back of the virtual space based on the position of the viewpoint in the virtual space;
    defining a first option, which is a location option of the plurality of location options included in the front of the virtual space;
    defining a second option, which is a location option of the plurality of location options included in the back of the virtual space;
    displaying the map object associated with the first option in the visual field in response to the line of sight being directed toward the front; and
    displaying the map object associated with the second option in the visual field in response to the line of sight being directed toward the back.

6. The method according to claim 1,
    wherein the predetermined motion comprises a motion of a head mounted device (HMD) configured to display the visual-field image, and
    wherein the method further comprises displaying the map object in the visual field in response to the detected motion of the HMD.

7. The method according to claim 1,
    wherein the first object comprises an avatar object associated with a second user, and
    wherein the method further comprises:
        receiving data for identifying a motion of the second user; and
        displaying the map object in the visual field depending on the motion of the second user.

8. The method according to claim 7, further comprising:
    identifying a position of the avatar object in the virtual space depending on a position of the viewpoint after movement in the virtual space; and
    displaying a second object indicating the position of the avatar object in the updated visual field.

9. The method according to claim 1,
    wherein the first object comprises an avatar object associated with a second user,
    wherein the map object includes a position of the viewpoint in the virtual space and a position of the avatar object in the virtual space, and
    wherein the identifying occupied location options comprises identifying the position of the viewpoint and the position of the avatar object as occupied.

10. The method according to claim 1, further comprising:
    recording a movement path of the viewpoint in the virtual space; and
    displaying a path object representing the movement path in the virtual space.

11. The method according to claim 10, further comprising:
    receiving an instruction to cancel movement of the viewpoint in the virtual space; and
    returning the viewpoint to a location prior to the canceled movement based on the instruction.

12. The method according to claim 11, further comprising:
    receiving, from the first user, an operation to select a position corresponding to the movement path included in the path object; and
    returning the viewpoint to the location prior to the canceled movement based on the operation.

13. The method according to claim 12, further comprising:
    identifying a line of sight of the first user;
    detecting the operation in response to the line of sight being directed toward the movement path included in the path object; and returning the viewpoint to the location prior to the canceled movement based on the operation.

14. The method according to claim 1, wherein displaying the map object comprises:
   displaying a first location option of the plurality of location options using a first icon; and
   displaying a second location option of the plurality of location options using a second icon different from the first icon.

15. The method according to claim 14, wherein the first location option is a location option of the viewpoint, and the second location option is a location option occupied by an avatar object associate with a second user.

16. The method according to claim 14, wherein the first location option is a location option of the viewpoint, and the second location option is an unoccupied location option.

17. The method according to claim 14, wherein the first location option is a location option of an avatar object associated with a second user, and the second location option is an unoccupied location option.

18. The method according to claim 1, wherein the displaying of the map object comprises displaying each location option of the plurality of location options.

19. The method according to claim 18, wherein the displaying each location option comprises:
   displaying occupied location options of the plurality of location options using a different mode from unoccupied location options of the plurality of location options.

20. The method according to claim 18, wherein the displaying each location option comprises:
   displaying occupied location options of the plurality of location options using a different icon from unoccupied location options of the plurality of location options.

* * * * *